(12) United States Patent
Kelekar

(10) Patent No.: US 8,127,359 B2
(45) Date of Patent: Feb. 28, 2012

(54) SYSTEMS AND METHODS FOR REAL-TIME NETWORK-BASED VULNERABILITY ASSESSMENT

(75) Inventor: Samir Gurunath Kelekar, Bangalore (IN)

(73) Assignees: Samir Gurunath Kelekar, Bangalore (IN); Praveer Gupta, New Delhi (IN)

( * ) Notice: Subject to any disclaimer, the term of this patent is extended or adjusted under 35 U.S.C. 154(b) by 1603 days.

(21) Appl. No.: 10/820,790

(22) Filed: Apr. 9, 2004

(65) Prior Publication Data

US 2005/0005169 A1 Jan. 6, 2005

Related U.S. Application Data

(60) Provisional application No. 60/461,818, filed on Apr. 11, 2003.

(51) Int. Cl.
*G06F 11/00* (2006.01)
*G06F 12/14* (2006.01)
*G06F 12/16* (2006.01)
*G08B 23/00* (2006.01)

(52) U.S. Cl. ............ 726/25; 726/22; 713/151; 709/224; 370/241

(58) Field of Classification Search ............ 726/25, 726/22; 713/151; 709/224; 370/241
See application file for complete search history.

(56) References Cited

U.S. PATENT DOCUMENTS

| | | | |
|---|---|---|---|
| 6,282,546 B1 * | 8/2001 | Gleichauf et al. | 707/102 |
| 6,324,656 B1 * | 11/2001 | Gleichauf et al. | 714/37 |
| 6,952,779 B1 * | 10/2005 | Cohen et al. | 726/22 |
| 7,089,428 B2 * | 8/2006 | Farley et al. | 726/22 |
| 7,152,105 B2 * | 12/2006 | McClure et al. | 709/224 |
| 2002/0104014 A1 | 8/2002 | Nesfeder et al. | |
| 2003/0028803 A1 | 2/2003 | Bunker et al. | |
| 2003/0056116 A1 * | 3/2003 | Bunker et al. | 713/201 |
| 2003/0195861 A1 * | 10/2003 | McClure et al. | 707/1 |
| 2003/0212779 A1 * | 11/2003 | Boyter et al. | 709/223 |
| 2004/0015728 A1 * | 1/2004 | Cole et al. | 713/201 |

OTHER PUBLICATIONS

Meltzer "Vulnerability Detection Systems (VDS) FAQ", pp. 1-13, Jan. 2003.*
Barnett "NOOSE—Networked Object-Oriented Security Examiner", USENIX 2000, pp. 369-378.*
Meltzer, D., "Vulnerability Detection Systems (VDS) FAQ", Internet Article, Online on Jan. 30, 2003, Retrieved from http://www.introsec.com/vds/vds-faq.htm on Aug. 19, 2004.

* cited by examiner

*Primary Examiner* — Techane Gergiso
*Assistant Examiner* — Shewaye Gelagay

(57) ABSTRACT

A system for real-time vulnerability assessment of a host/device, said system comprising an agent running on the host/device. The agent includes a first data structure for storing the status of interfaces and ports on the interfaces of the host/device. An n executable agent module is coupled to the first data structure to track the status of interfaces and ports on the interfaces of the host/device and to store the information, as entries in said first data structure. The executable agent module compares the entries to determine a change in the status of interfaces and/or of ports on the interfaces of the host/device. A remote destination server is provided that includes a second data structure for storing the status of interfaces and the ports on the interfaces of the host/device. An executable server module is coupled to the second data structure to receive the information communicated by the agent executable module of the agent on the host/device. The executable server module stores the received information as entries in the second data structure wherein the entries indicate the state of each of the ports on each of the active interfaces of the host/device as received. The executable server module compares the entries in said data structures to determine the change in the status of interfaces and ports on the interfaces of the host/device. The executable server module runs vulnerability assessment tests on the host/device in the event of a change in the status of interface/ports.

34 Claims, 16 Drawing Sheets

SYSTEMS AND METHODS FOR REAL-TIME NETWORK-BASED VULNERABILITY ASSESSMENT

CROSS-REFERENCE TO RELATED APPLICATIONS

Figure 1:
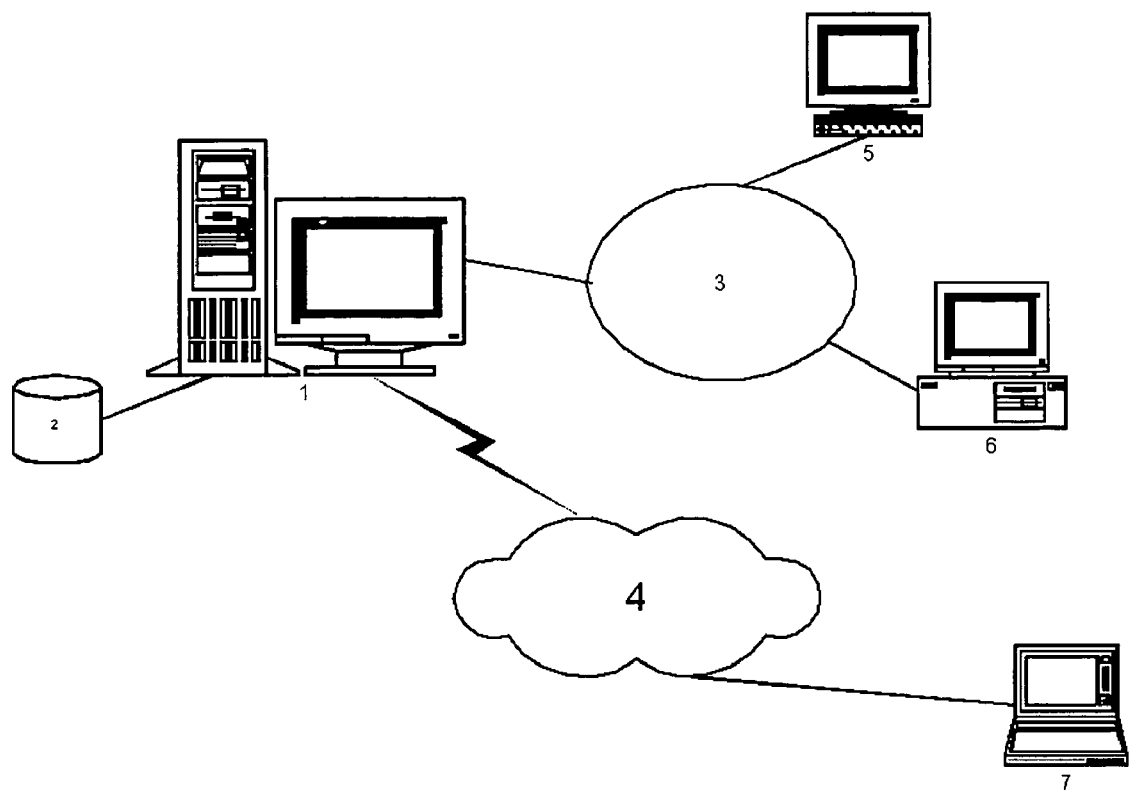

This Application claims priority from provisional application Ser. No. 60/461,818 filed on Apr. 11, 2003, the contents of which are incorporated herein by reference.

BACKGROUND OF THE INVENTION

1. Technical Field

The present invention relates to a system that ensures real-time network-based vulnerability assessment of an enterprise/consumer host/device. The present invention also provides a method of implementing the system to ensure real-time network-based vulnerability assessment of the host/device.

2. Description of the Related Art

Vulnerability Assessment (VA)

A host (or a device) connects to a network by running one or more network accessing processes, typically called network services. A network service is so called because the service provides some service to the user of the host (or the device) that entails communication to and from the some other host/device on the network; for instance, a service could be a mail service provided by a mail server, or a chat service provided by a chat client/server. These service processes access the underlying network interface software to provide the required service(s) to the users. For instance in the TCP/IP protocol, a popular networking protocol, if the use of the Sockets utility is considered, a utility that is usually used to access the network, these services either access a network port actively by making a connect call to access another service on another machine across the network—one having a different IP address—or wait passively by making listen and accept calls for another process on the network running on a different host or a device to connect to this service. A port is a logical abstraction that denotes an endpoint on each of the two machines which have a logical connection between them. Different TCP and UDP services run on different ports. Protocols other than TCP and UDP have other paradigms to access the network.

For instance, a network service such as ping that uses the ICMP protocol does not entail the use of ports.

There could be a security breach in a service made from across the network if there is security vulnerability in the service. Security vulnerabilities could be of different kinds: for instance there could be a vulnerability in the software of the executable that comprises of the service itself; several kinds of vulnerabilities are known; for instance a service could have a buffer overflow vulnerability [2] [Counter Hack, A step-by-step Guide to Computer Attacks and Effective Defenses, Ed Skoudis, Prentice Hall (2002)] in it, or it could have a hidden backdoor [2] [Counter Hack, A step-by-step Guide to Computer Attacks and Effective Defenses, Ed Skoudis, Prentice Hall (2002)]. The Common Vulnerabilities and Exposures (CVE) [3] [http://cve.mitre.org] list keeps track of known vulnerabilities in standard network service programs offered by well-known vendors. It is also possible that the software itself might not have any vulnerability but the service is configured in such a way to lend itself to security vulnerability. For instance, the popular UNIX based sendmail service could be configured to enable relaying, whereby users can use the particular sendmail server to send spam to other users. It is also possible that a hacker has planted a listening backdoor to which he/she can connect from outside. Other security breaches in a service could be made via a denial-of-service attack conducted on the service. In a denial-of-service attack, the port on which the service is running or the host itself—or the host itself in case of services not running on any ports—is flooded with packets so as to exhaust the resources (bandwidth and/or memory) available for a genuine party across the network to access the service or for the service to have access to a genuine party across the network. Genuine here refers to the users who are not flooding the service with a denial-of-service attack, and want to connect to the host to avail of the particular offered service.

Vulnerability assessment (VA) is the process of finding out if the network services that run on a host have vulnerabilities that are prone to security violations of the above kind.

Vulnerability assessment tools are of two kinds: host-based and network-based.

Host-based vulnerability assessment is done by running a VA tool on the host itself and it can find vulnerabilities in all the services that the host runs, not necessarily just services accessible remotely. Network-based vulnerability assessment is done by running a vulnerability assessment tool to access the target host from across the network and it can thus find vulnerabilities in the network services remotely. In this invention, network-based vulnerability assessment is only considered. (Target here refers to the host or device the vulnerability of which is to be assessed.) Future references to vulnerability assessment in this description or in the claims, would imply network-based vulnerability assessment unless specified otherwise. The (network-based) vulnerability assessment itself is usually carried in two stages: the first stage comprises of finding out which services are running and the second stage comprises running scripts to do vulnerability assessment on these services. Part of the first stage consists of port scanning. Port scanning is the process of figuring out if a particular port on the target host is open, and this is done by sending various kinds of packets to the port. These packets could include among others TCP SYN, and ACK packets, UDP packets etc. Depending on the response received, the port scanner concludes if the particular port is open or not; in other words, if there is a service listening on the particular port. The other part of the first stage involves finding out whether other services—ones not associated with any port—such as ICMP services are running on the host machine. The second part of the first stage involves running scripts to identify the services that are listening on the various open ports found. This is done by giving commands to read the banners of these services remotely.

The second stage in Vulnerability assessment involves running the scripts to figure out vulnerabilities in the services found in the first stage.

A VA tool generally has a list of scripts, one each to test for each vulnerability. For each of those ports which are open as found in the port scanning stage, the VA tool runs scripts to figure out which service may be running on the port, and then runs the scripts to test for the presence of those vulnerabilities pertaining to the particular service(s). In this way, the VA tool finds out if a particular vulnerability among the list of vulnerabilities for which it has scripts exists in the service.

VA tools also find vulnerabilities in network services that are not bound to any port. As mentioned before, this involves sending packets such as ICMP packets to figure out if there are network services that are not bound to any port running on the host in the first stage. The second part would again entail running a script to send various specially carved packets to test for vulnerabilities in these services.

The pertinent point about VA tools is that they do not discover new vulnerabilities in a service on the fly. They only check for and detect previously known vulnerabilities (those whose signatures they know of) in services running on the target host. Most VA tools have a provision for updating and augmenting their vulnerability scripts so as to include testing for latest and newly discovered vulnerabilities in services.

SATAN [4] [Practical Unix and Internet Security, Simson Garfinkel and Gene Spafford, 2 nd Edition, 1996, Oreilly] was one of the first VA tools developed. Now, there are many open-source as well as proprietary VA tools available. Prominent among them are products from eEye Digital security, Nessus, NetIQ, Network Associates, Patchlink, Harris, Cisco, Bindview and Internet Security Systems.

VA tools are generally run once in a while; typically security managers run these tools once a month or once in a few weeks or once a day depending on the security policy of the enterprise.

The following are the factors concerning VA tools and the target host relevant to this invention.

On any host/device in an enterprise network, as users use the host, they start and stop various network services (in the case of TCP and UDP services, a port is associated with these services) in the course of their work. For instance, a user might start a chat software such as Yahoo messenger; another user may share his/her files through an SMB share, or another user might start an ftp server to share files. As users start new services or reconfigure existing services, they can make these services vulnerable provided these services have in them the kind of vulnerabilities described in the above section. Thus, the vulnerability status of a host changes dynamically as a function of time.

Given that a security policy of an enterprise dictates that VA tools be run once in a few days/weeks or months, and VA tools are run as per above, the vulnerability status of the host is not checked in the intermediate time period, that is between two runs of a VA tool. (To be precise, it is possible for an enterprise to have a security policy that mandates running vulnerability assessment tools all the time except that this would take a whole lot of bandwidth and could make normal working of the system difficult.) As new services get started and stopped and reconfigured all the time, vulnerabilities go undetected in the host and the host is prone to attacks.

Thus, it becomes important to make sure that not just vulnerabilities in services are detected once in a while (as and when VA tools are run as per current security policies), but that vulnerabilities should be detected the moment they occur or are manifested. This then is the one of the themes of the invention described here. (The invention is described in detail in the subsequent sections.) The invention tracks—via deploying of an agent—the start of services in real-time, and detects the vulnerabilities found in the services in real-time. The above is carried out by monitoring the status of ports—whether open or not—on the various active interfaces of the host/device. Vulnerabilities produced due to reconfiguration of services are also detected in real-time. (Here the assumption is that to reconfigure a service, one must stop it and then start it again.) Even backdoors are detected in real-time. A backdoor is a listening service that a hacker might plant on a machine, through which he/she would want to connect to the machine.

The other important theme of the invention is one which results in a "deploy and forget" model for this invention and is a major source of convenience and saving of resources for enterprises/consumers. Currently VA tools are run on specific times and as per specific schedules. Apart from missing the vulnerabilities that are manifested between two runs of the VA tool, the other problem that comes up because of the above is that a run of the VA tool may be redundant if there is no change in the vulnerability status of the network since the earlier run of the VA tool. This invention makes it possible to run a VA tool and further only those vulnerability tests from the VA tool only when they are required to be run, and this run is triggered automatically by the system. Thus, deploying a product based on this invention results in a "deploy and forget" model of invention, where the security administrator need to only deploy the tool once and then wait for alerts on new vulnerabilities. Issues such as when to run the vulnerability tests and to what extent is taken care of by the tool by itself. This then is the other theme of this invention.

Related Work:

As regards the first theme of the invention, there has been related work in areas such as vulnerability assessment [5,9, 10,11]{["System and method for rules-driven multi-phase network vulnerability assessment" U.S. Pat. No. 6,324,656, Nov. 27, 2001, Gleichauf, et al., Cisco Technologies Inc.], ["Method and system for adaptive network security using intelligent packet analysis" U.S. Pat. No. 6,499,107, Dec. 24, 2002, Gleichauf, et al., Cisco Technologies, Inc.], ["Method and system for adaptive network security using network vulnerability assessment" U.S. Pat. No. 6,301,668, Oct. 9, 2001, Gleichauf, et al, Cisco Technologies, Inc.], ["System and method for real-time insertion of data into a multi-dimensional database for network intrusion detection and vulnerability assessment", U.S. Pat. No. 6,282,546, Aug. 28, 2001, Gleichauf, et al, Cisco Technologies, Inc.]}[5] ["System and method for rules-driven multi-phase network vulnerability assessment" U.S. Pat. No. 6,324,656, Nov. 27, 2001, Gleichauf, et al., Cisco Technologies Inc.] relates to doing vulnerability assessment using a multi-dimensional database. It does not track the changes in the vulnerability status of the host/device due to start and stop of services in real-time, and incorporate it into its multi-dimensional database. [11] ["System and method for real-time insertion of data into a multi-dimensional database for network intrusion detection and vulnerability assessment", U.S. Pat. No. 6,282,546, Aug. 28, 2001, Gleichauf, et al, Cisco Technologies, Inc.] has a facility for real-time insertion of data feed into the database, but it is picked up from data processed by an intrusion detection system. Real-time tracking of start and stop of services for purposes of real-time vulnerability assessment is not part of the above.

Qualys [6] ["Qualys First to Provide Real-Time Vulnerability Assessment for Check Point Firewalls" http://www.checkpoint.com/press/partners/2002/qualys032502.html] claims to do a vulnerability scan of a network when a configuration of a firewall (specifically Checkpoint firewall) deployed in the network is changed. A firewall is not a network service; (a network service is a service that involves to and from communication with another entity across the network.) A firewall is basically a filter meant to secure the network. Also, since a firewall is a security service, it is obvious that a change in firewall configuration will change the vulnerability status of the network. What is subtle and non-obvious however is that vulnerability status of the network can change anytime a new network service is started on a host or the configuration of any network service running on the host is changed.

There is also work done in the area of execution monitoring of applications [7] [Automated Detection of Vulnerabilities in Privileged Programs by Execution Monitoring", Ko et al., Proc. of the 10th Annual Computer Security Applications Conference, Orlando, Fla. (found at http://seclab.cs.ucdavis.edu/papers.html), 1994] but this work relates to finding out whether these services whose execution is being monitored are compromised due to vulnerabilities present in them, by checking their execution traces. This invention is different in the sense that the present invention does not monitor the execution trace of the application. The present invention signals the beginning or the reconfiguration of the application and then trigger a vulnerability assessment tool which will check for potential vulnerabilities in the service, and not for actual compromises. The former work comes under the area of intrusion detection while the present invention comes under the area of near real-time vulnerability assessment.

Other work peripherally related is in the area of patch management [8,12] {[http://www.patchlink.com], ["Non-invasive off-site patch fingerprinting and updating system and method", United States Patent Application, 20020100036, Jul. 25, 2002, Moshir Sean et al, Patchlink.com Corporation]}. Patchlink is a company which has a patch management product. The product does a Vulnerability assessment on the enterprise host, and updates various software installed on the host with patches. The closest Patchlink's product comes to a feature of the present invention is their patch-compliance feature wherein if the feature is invoked, the patchlink product tracks if any of the patches deployed have been rolled back. Thus, there seems to be a real-time tracking of rollback of patches which is a small part of tracking whether a service is reconfigured.

There is also work done in the area of real-time vulnerability assessment [13] ["Network vulnerability assessment system and method", United States Patent application, 20030028803, Feb. 6, 2003, Bunker Nelson Waldo V. et al]. However, the real-time here does not refer to real time tracking of the beginning of services.

As regards the second theme of the invention, Qualys has a web services model for its vulnerability assessment offering where they do an 'on demand' vulnerability assessment. Here, the security administrator can give inputs to Qualys on when he/she wants their vulnerability assessment tool—which is launched from a web-server on the network—to run. However, this is different from the 'deploy and forget' model of the present invention which is a 'run when the system requires it' model which runs only those vulnerability assessment tests which are needed, and when they are needed. This need is determined not arbitrarily or wishfully by the security administrator but is determined by which services are started at what time, and thus by change in the vulnerability status of the system. Thus, the present invention does a more optimal job, not to mention that an 'on demand' model can miss vulnerabilities which the present invention cannot.

[17] ["System and method for network vulnerability detection and reporting", United State patent application, 20040015728, Cole David M, Hanzlik Dennis J., Filed Mar. 10, 2003] is an invention that is about an improved way of doing vulnerability assessment. [16] ["Tightly integrated cooperative telecommunications firewall and scanner with distributed capabilities", U.S. Pat. No. 6,226,372, Beebe, et al, May 1, 2001] combines firewall and scanner technology.

CITED REFERENCES

1) Internetworking with TCP/IP Vol. 1, Principles, Protocols, and Architecture, Douglas Corner, 4th Edition, Prentice Hall, 2000.
2) Counter Hack, A step-by-step Guide to Computer Attacks and Effective Defenses, Ed Skoudis, Prentice Hall (2002).
3) http://cve.mitre.org
4) Practical Unix and Internet Security, Simson Garfinkel and Gene Spafford, 2 nd Edition, 1996, Oreilly.
5) "System and method for rules-driven multi-phase network vulnerability assessment" U.S. Pat. No. 6,324,656, Nov. 27, 2001, Gleichauf, et al., Cisco Technologies Inc.
6) "Qualys First to Provide Real-Time Vulnerability Assessment for Check Point Firewalls" http://www.checkpoint.com/press/partners/2002/qualys032502.html
7) Automated Detection of Vulnerabilities in Privileged Programs by Execution Monitoring", Ko et al., Proc. of the 10th Annual Computer Security Applications Conference, Orlando, Fla. (found at http://seclab.cs.ucdavis.edu/papers.html), 1994.
8) http://www.patchlink.com
9) "Method and system for adaptive network security using intelligent packet analysis" U.S. Pat. No. 6,499,107, Dec. 24, 2002, Gleichauf, et al., Cisco Technologies, Inc.
10) "Method and system for adaptive network security using network vulnerability assessment" U.S. Pat. No. 6,301,668, Oct. 9, 2001, Gleichauf, et al, Cisco Technologies, Inc.
11) "System and method for real-time insertion of data into a multi-dimensional database for network intrusion detection and vulnerability assessment", U.S. Pat. No. 6,282,546, Aug. 28, 2001, Gleichauf, et al, Cisco Technologies, Inc.
12) "Non-invasive off-site patch fingerprinting and updating system and method", United States Patent Application, 20020100036, Jul. 25, 2002, Moshir Sean et al, Patchlink.com Corporation.
13) "Network vulnerability assessment system and method", United States Patent application, 20030028803, Feb. 6, 2003, Bunker Nelson Waldo V. at al.
14) www.nessus.org, Nessus, the open-source VA tool.
15) Visual Modeling with Rational Rose and UML, Terry Quatrani, Addison Wesley, 1998.
16) "Tightly integrated cooperative telecommunications firewall and scanner with distributed capabilities", U.S. Pat. No. 6,226,372, Beebe, at al, May 1, 2001.
17) "System and method for network vulnerability detection and reporting", United State patent application, 20040015728, Cole David M, Hanzlik Dennis J., Filed Mar. 10, 2003.
18) "Method and system for configuring and scheduling security audits of a computer network", United States patent application, 20020104014, A1 Zobel, Robert David et. al, Aug. 1, 2002.

SUMMARY

According to one embodiment, the invention provides for a system of real-time network-based vulnerability assessment of a host/device by tracking the status of ports—whether open or not—and the status of various interfaces—whether active or not—of the host/device and then assessing the vulnerabilities in the network services running on the ports remotely.

According to another embodiment, the invention accomplishes the goal of real-time vulnerability assessment by consuming as little communication bandwidth as possible by doing incremental vulnerability assessment as far as possible.

As per yet another embodiment, the invention accomplishes the goal of real-time vulnerability assessment by running only those vulnerability tests which are required and not run more tests.

As per yet another embodiment, the invention describes a system that does not miss any vulnerability while at the same time conceives of a tool that enables a 'deploy and forget' model; that is, the tool has to be deployed only once, and the security administrator does not have to schedule vulnerability assessment tests but the scheduling of the tests and runs of the tests take place according to the needs of the system while at the same time not consuming high bandwidth and other resources.

As per yet another embodiment, a method of implementing said system to assess vulnerabilities in real-time is provided.

BRIEF DESCRIPTION OF THE ACCOMPANIED DIAGRAMS

A brief description of the diagrams along with their legend is given below.

FIG. 1 depicts a system for real-time vulnerability assessment of a host/device as per one embodiment of the invention. the system diagram of the invention.

Legend:

Vulnerability assessment Server: This runs the server application which consists of a vulnerability assessment tool as well as the vulnerability and script database, as well as all the modules that are needed to keep track of the various agents that connect to the server as well as various other bookkeeping. The server communicates with the alert agent and exchanges information with the agent.

The vulnerability and script database. The scripts are the vulnerability assessment tests.

Intranet (part of VPN)
Internet (part of VPN)
Host/device and agent running Linux desktop.
Host/device and agent running on a Microsoft platform desktop.
Another host/device and agent running on a Laptop machine.

Figure 2:
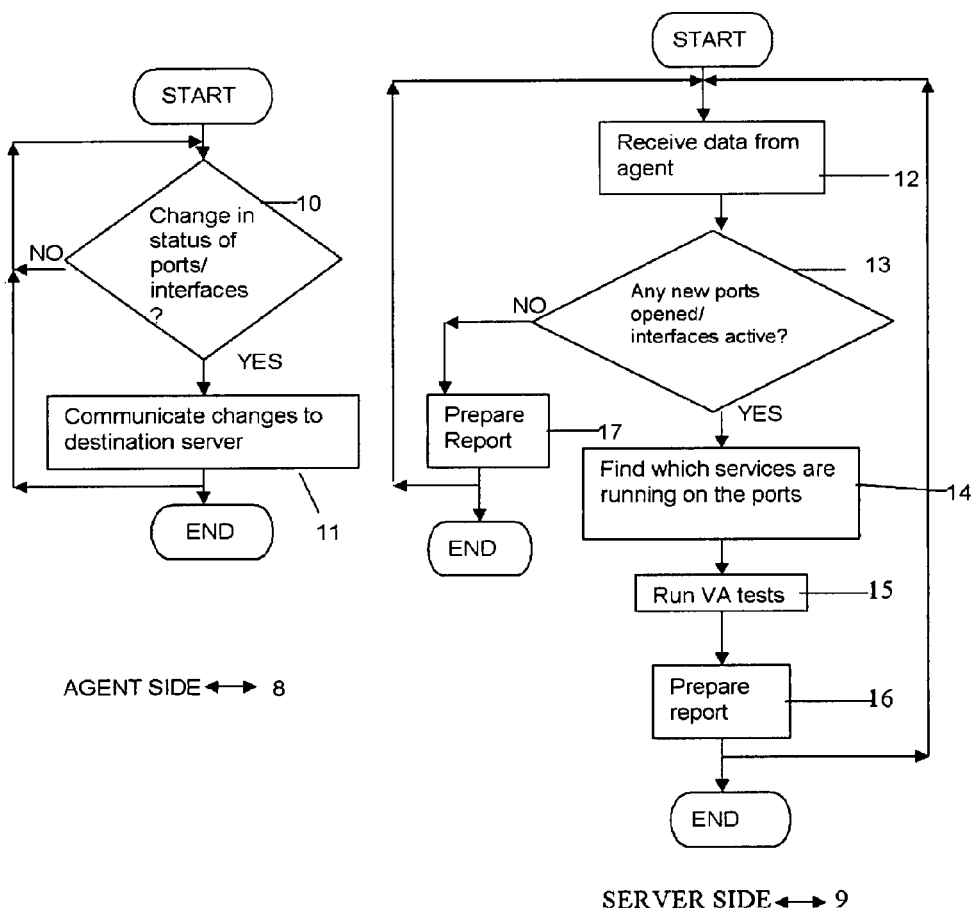

FIG. 2 depicts the flow of events in the agent and the destination server in one embodiment of the invention.

Legend:
Agent side
Destination server side.
Agent side checks if there is any change in the status of port/interfaces on the host/device.
Agent side communicates changes if any to the server.
Server receives data concerning changes from the agent.
Server checks if any new ports have been opened or any new interfaces have become active.
Server runs tests to find which services are running on the newly opened ports.
Server runs relevant Vulnerability assessment (VA) tests on the host/device.
Server prepares vulnerability status report.
Server prepares vulnerability status report.

Figure 3:
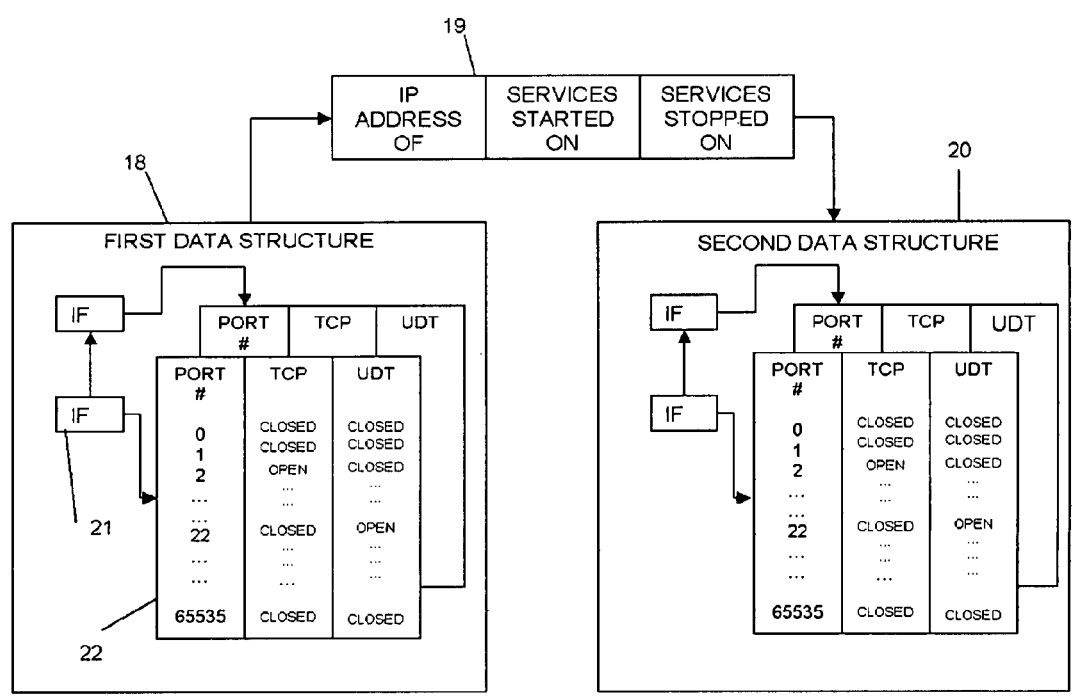

FIG. 3 depicts the data structures for tracking the start/stop of services on the host/device as per one embodiment of the invention.

First data structure present on the agent.
Message format of message passed from the agent to the server.
Second data structure, present on the destination server.
Part of the data structure depicting an interface.
Part of the data structure depicting an array to store the status of ports.

Figure 4:
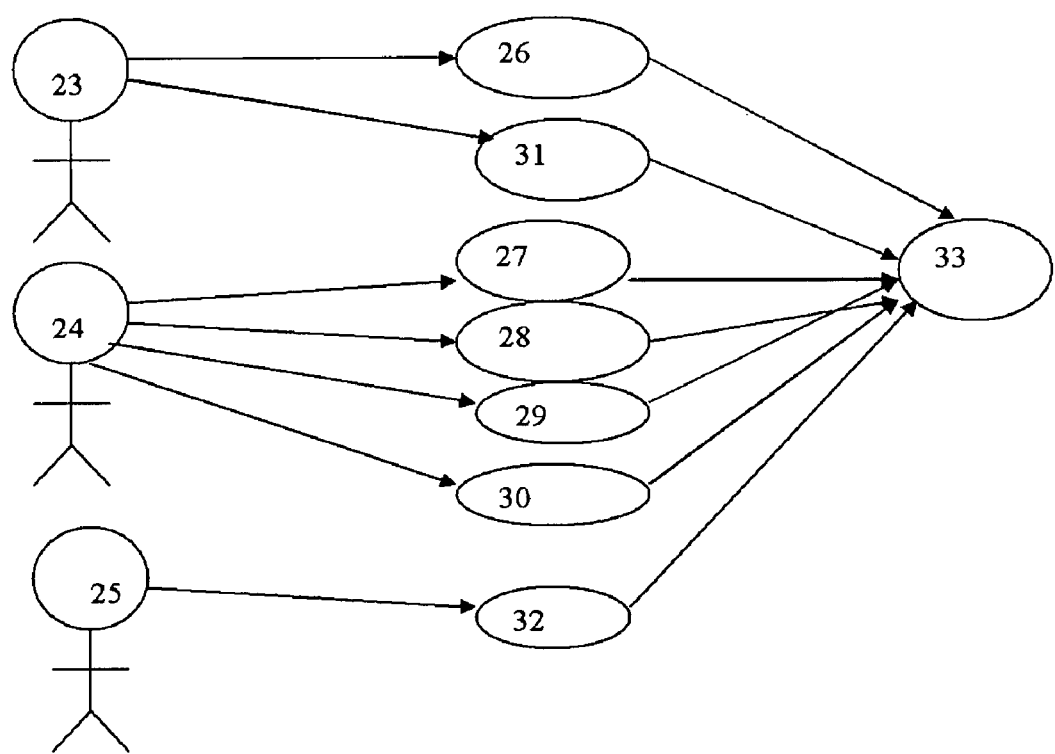
Figure 5:
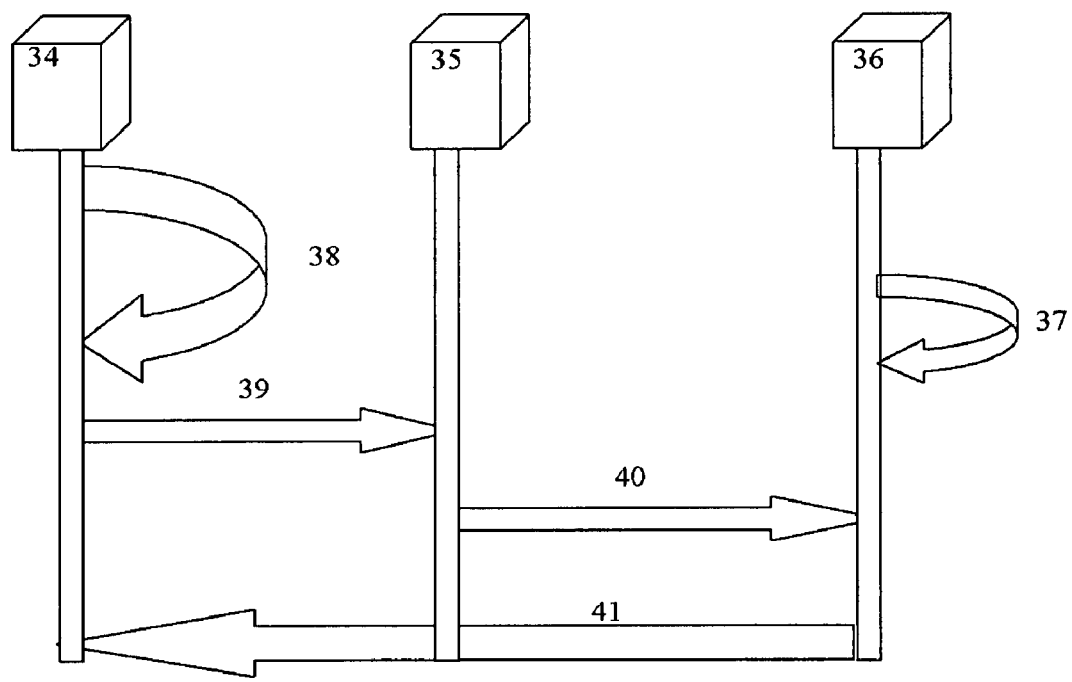

FIG. 4 depicts the use case diagram for a design of the system as per one embodiment of the invention.
23 Actor: System Administrator
24 Actor: User
25 Actor: Vulnerability Assessment Server Vendor
26 Start of the server and the agent
27 System response to starting of a new listening service (that is, opening of a port on which a service listens)
28 System response to stopping of a listening service (that is closing of a port on which a service listens)
29 System response to a new network interface becoming active
30 System response to a network interface becoming inactive
31 Stop of the agent
32 System response to update of vulnerability and script database
33 Vulnerability Assessment FIG. 5 depicts the use case named start the server and the agent as per one embodiment of the invention

LEGEND

Figure 6:
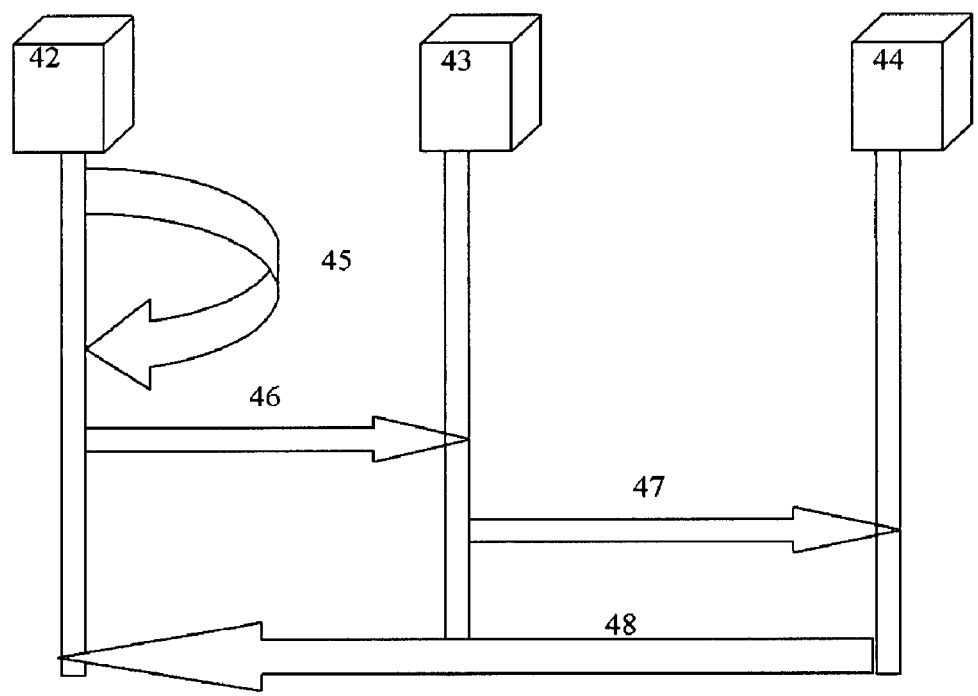

34 Host/device
Alert Agent
36 Vulnerability assessment server
37 Event: starting of the server on the server machine
38 Event: starting of the agent on the host/device
39 Event: Alert agent tracks the ports on which services are listening on the host/device
40 Event: Alert agent communicates the above fact to the vulnerability assessment server
41 Vulnerability assessment server does Vulnerability assessment and reports the results to the agent FIG. 6 depicts the use case named system response to start of a service as per one embodiment of the invention

LEGEND

42 Host/device
43 Alert Agent
44 Vulnerability assessment server
45 Event: start of a new service
46 Event: Alert agent tracks the start of the service
47 Event: Alert agent communicates the above fact (namely the port number on which the new service is listening) to the vulnerability assessment server
48 Vulnerability assessment server compares the status of open ports that it has with the new status and if it finds a difference then it finds which service is running and does Vulnerability assessment and reports the result to the Agent. (Use case: Vulnerability assessment)

Figure 7:
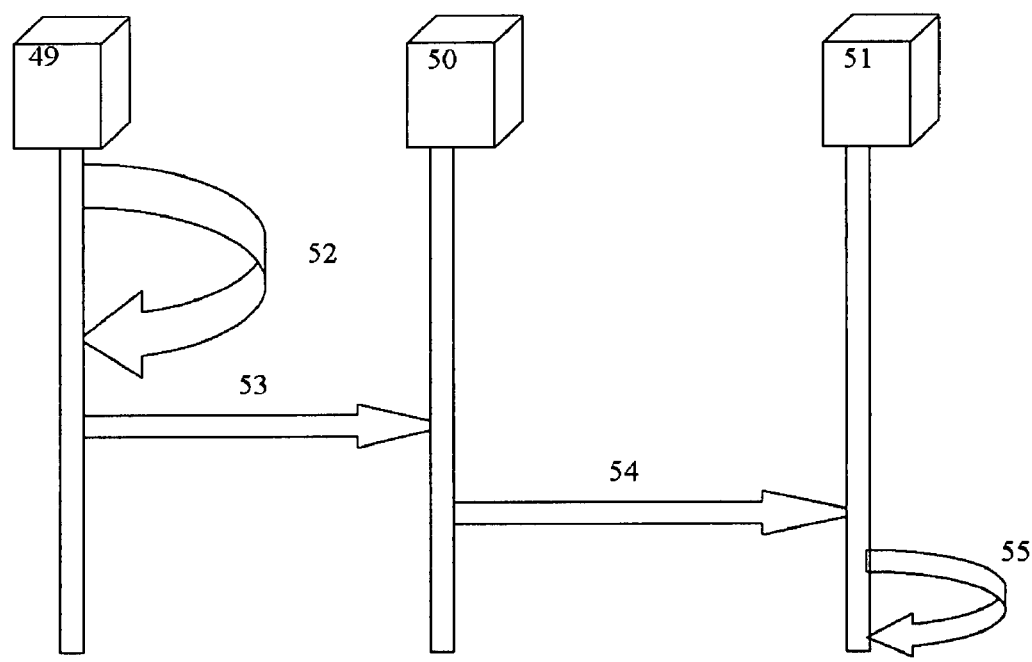

FIG. 7 depicts the use case named system response on stop of a service as per one embodiment of the invention

LEGEND

Figure 8:
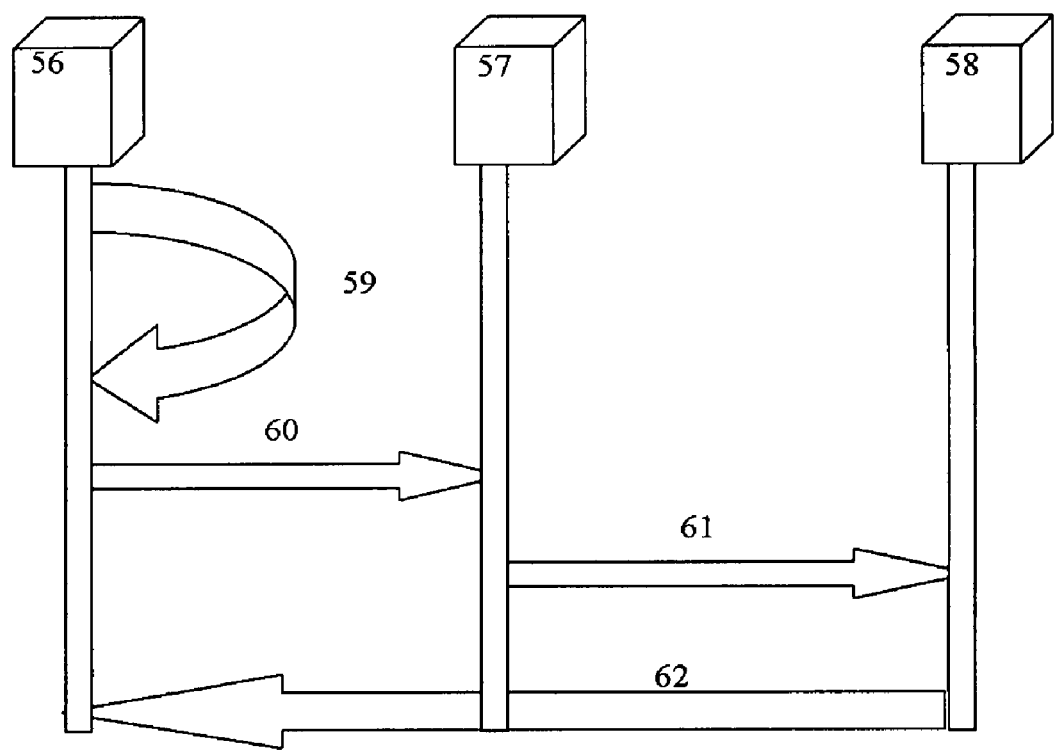

49 Host/device
50 Alert Agent
51 Vulnerability assessment server
52 Event: a service is stopped
53 Event: Alert agent tracks the stopping of the service
54 Event: Alert agent communicates the above fact (namely, the port number) to the vulnerability assessment server
55 Vulnerability assessment server updates its status of open ports and since no new service is started does not do Vulnerability assessment FIG. 8 depicts the use case named system response on a network interface becoming active in one embodiment of the invention.

LEGEND

56 Host/device
57 Alert Agent

58 Vulnerability assessment server
59 Event: a network interface becomes active
60 Event: Alert agent tracks the above fact that a network interface has become active, and notes the numbers of ports on which there are listening services on the new interface
61 Event: Alert agent communicates the above fact to the vulnerability assessment server
62 Vulnerability assessment server does Vulnerability assessment on the services which are listening on the various ports of the new interface (Use case: Vulnerability assessment)

Figure 9:
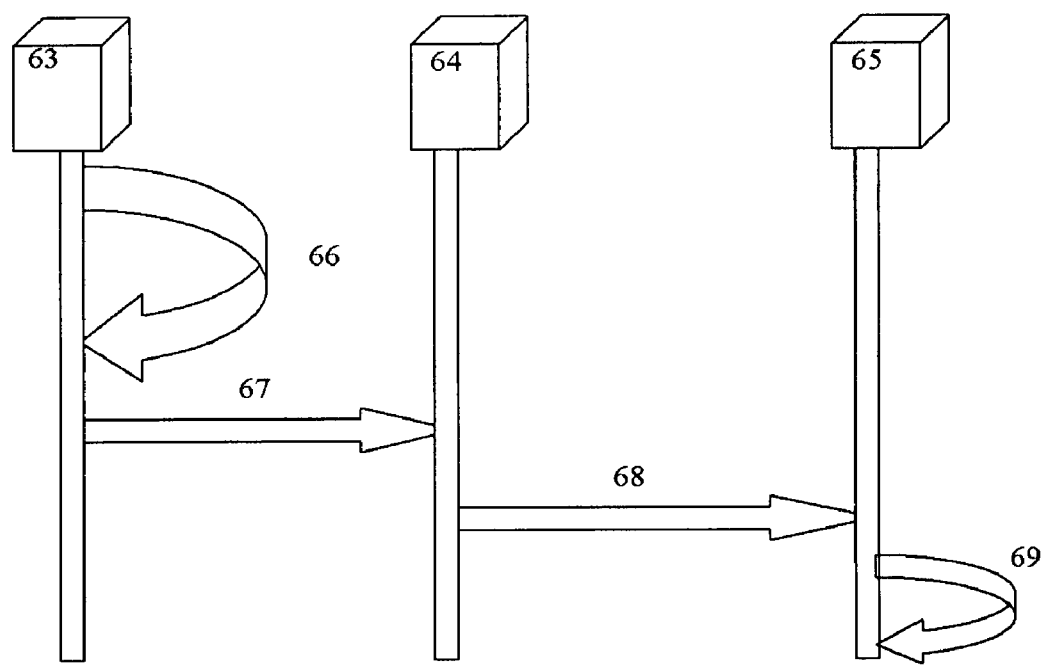

FIG. 9 depicts the use case named system response on a network interface becoming inactive in one embodiment of the invention.

LEGEND

Figure 10:
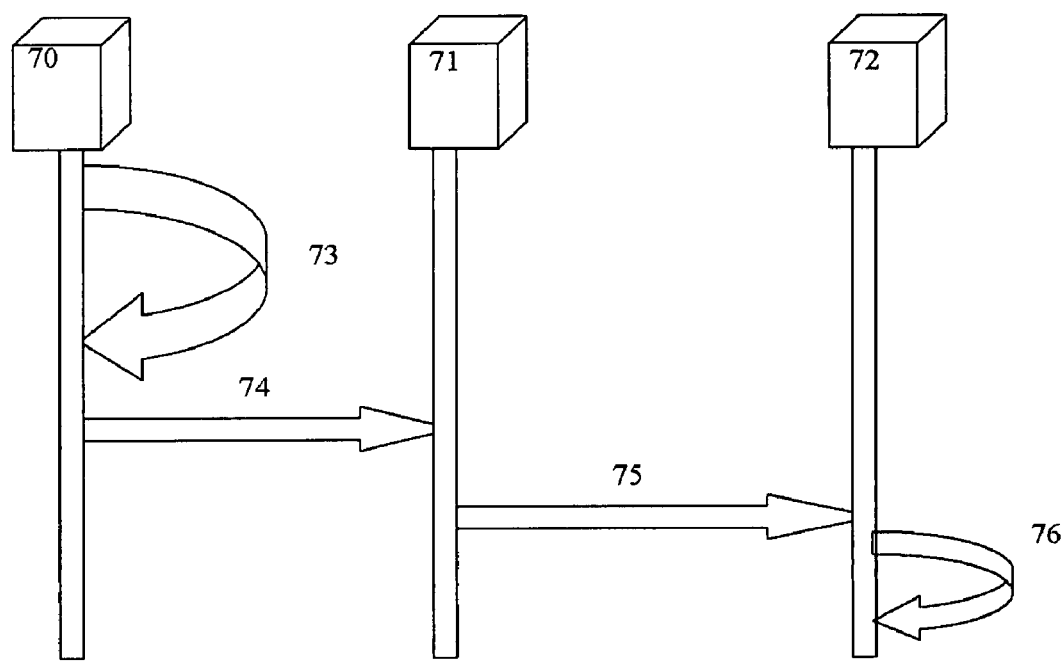

63 Host/device
64 Alert Agent
65 Vulnerability assessment server
66 Event: a network interface becomes inactive
67 Event: Alert agent tracks the above fact that a network interface has become inactive, and notes the numbers of ports on which there were listening services on the interface
68 Event: Alert agent communicates the port numbers on which services have stopped due to the interface becoming inactive to the vulnerability assessment server
69 Event: Vulnerability assessment server updates its local data about the particular interface FIG. 10 depicts the use case named system response on stopping the agent application as per one embodiment of the invention.

LEGEND

70 Host/device
71 Alert Agent
72 Vulnerability assessment server
73 Event: a network interface becomes active
74 Event: Alert agent tracks the above fact that a network interface has become active, and notes the numbers of ports on which there are listening services on the new interface
75 Event: Alert agent communicates the above fact to the vulnerability assessment server
76 Event: vulnerability assessment server updates its data.

Figure 11:
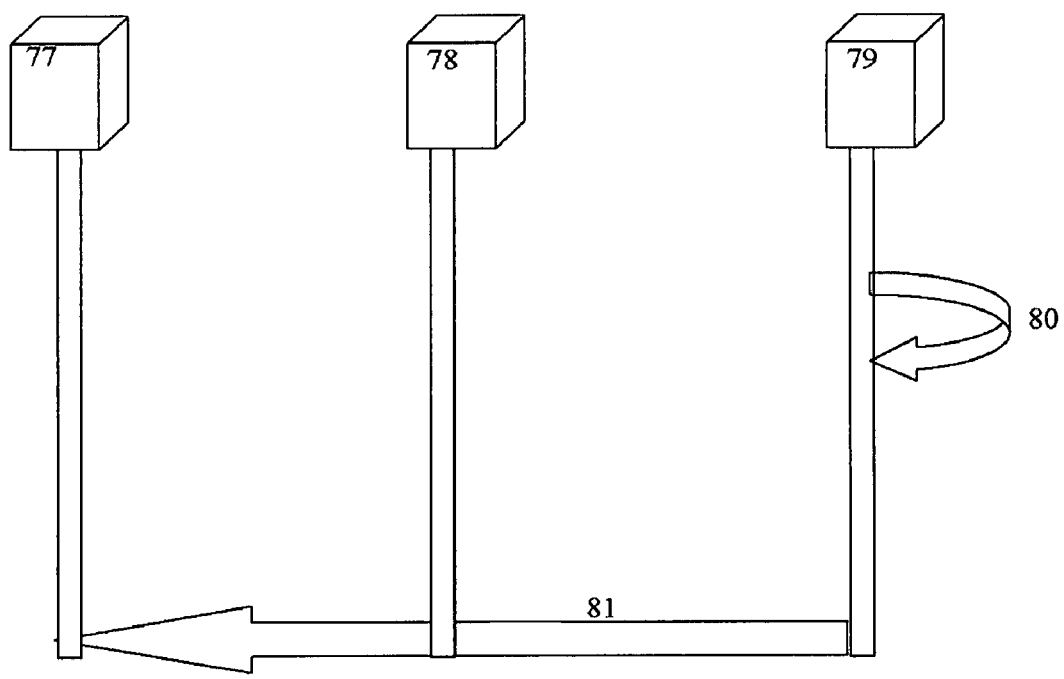

FIG. 11 depicts the use case named system response on update of vulnerability database as per one embodiment of the invention Legend:

77 Host/device
78 Alert Agent
79 Security Assurance server
80 Event: vulnerability and script database is updated.
81 Security assurance server does Vulnerability assessment (Use case: Vulnerability assessment)

Figure 12:
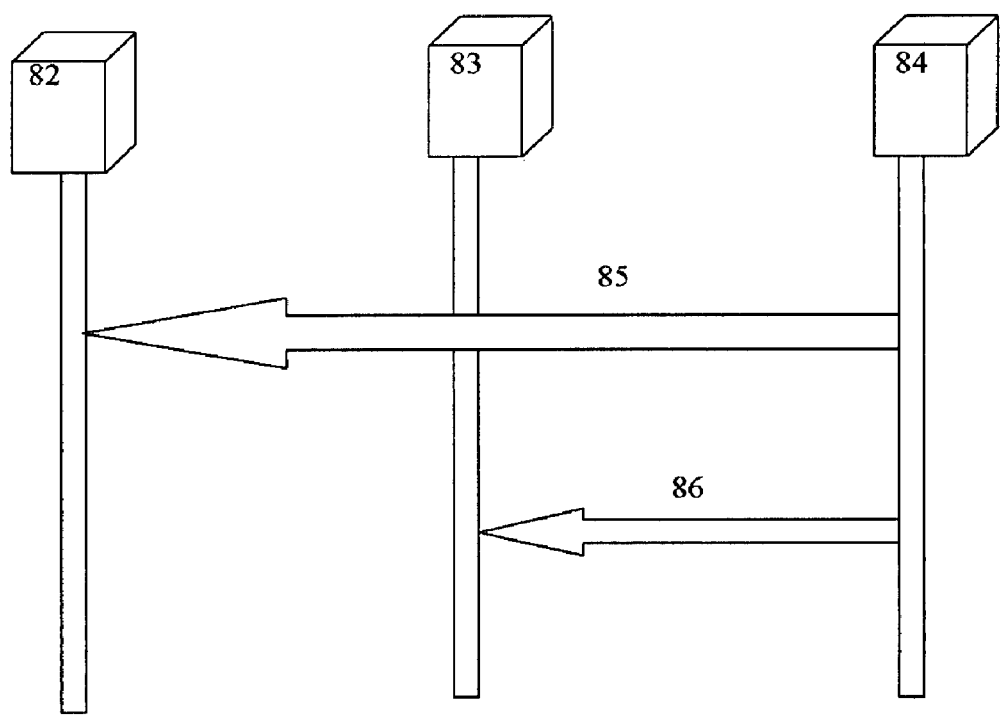

FIG. 12 depicts the use case named vulnerability, assessment as per one embodiment of the invention

LEGEND

Figure 13:
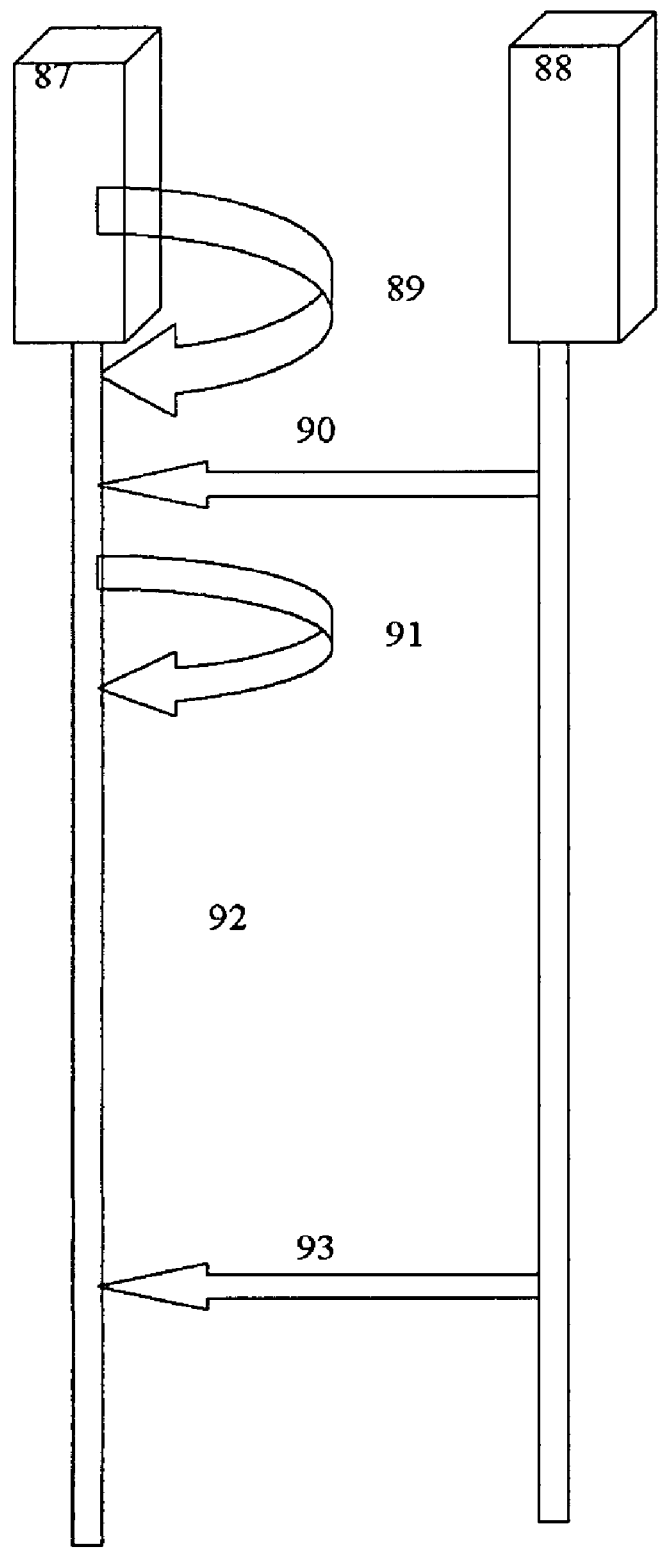
Figure 14:
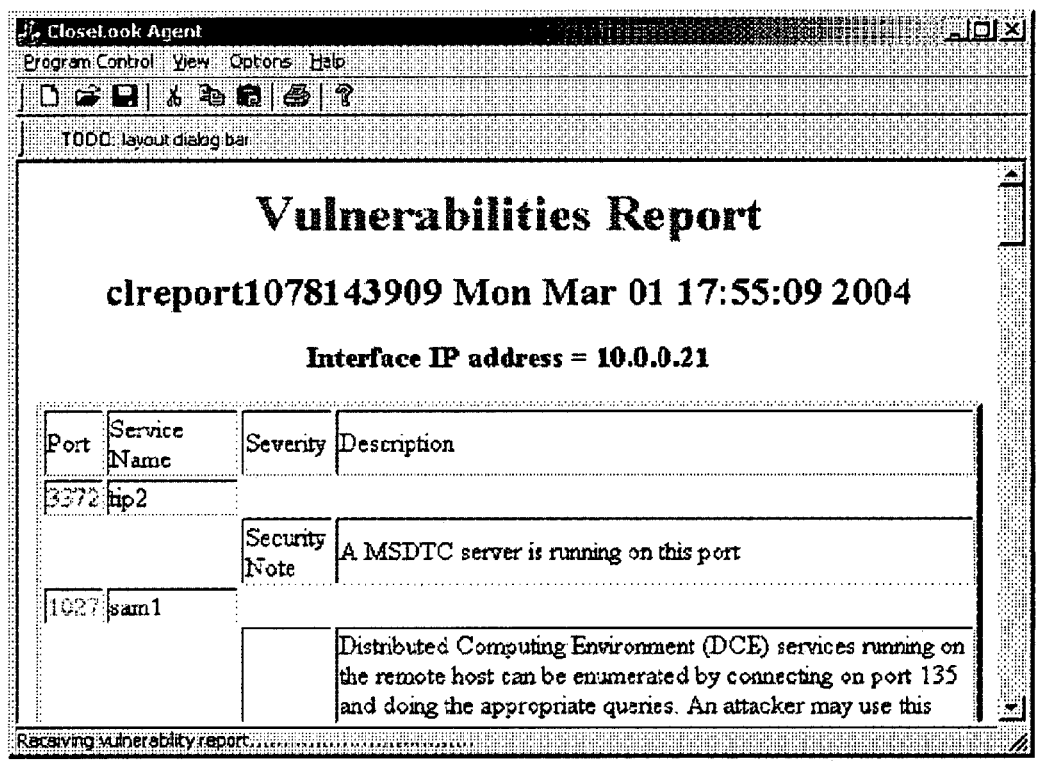
Figure 15:
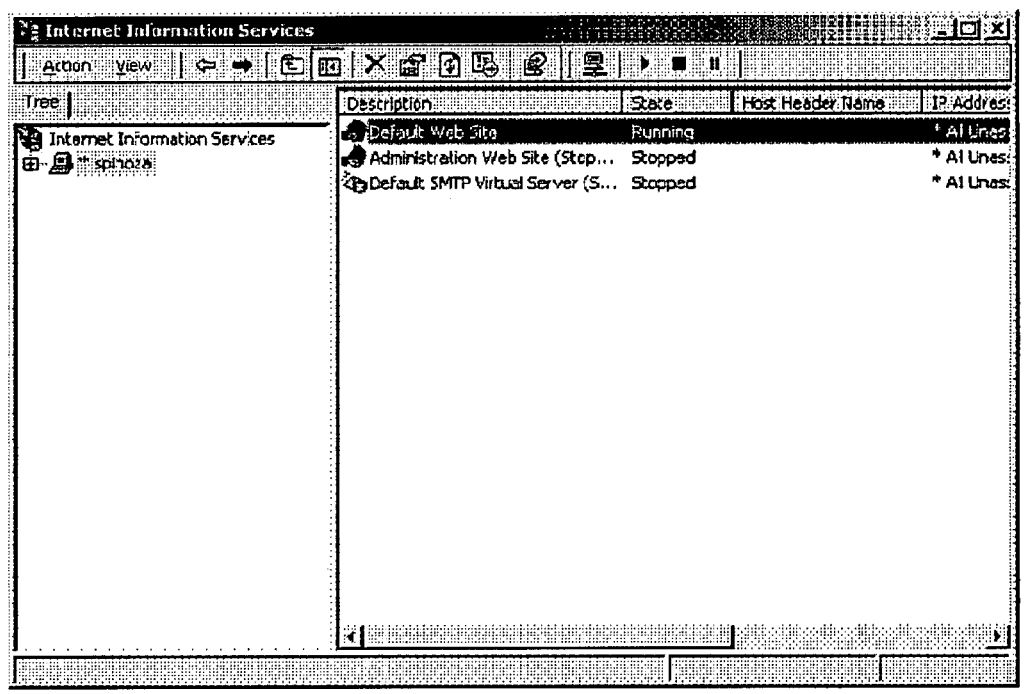
Figure 16:
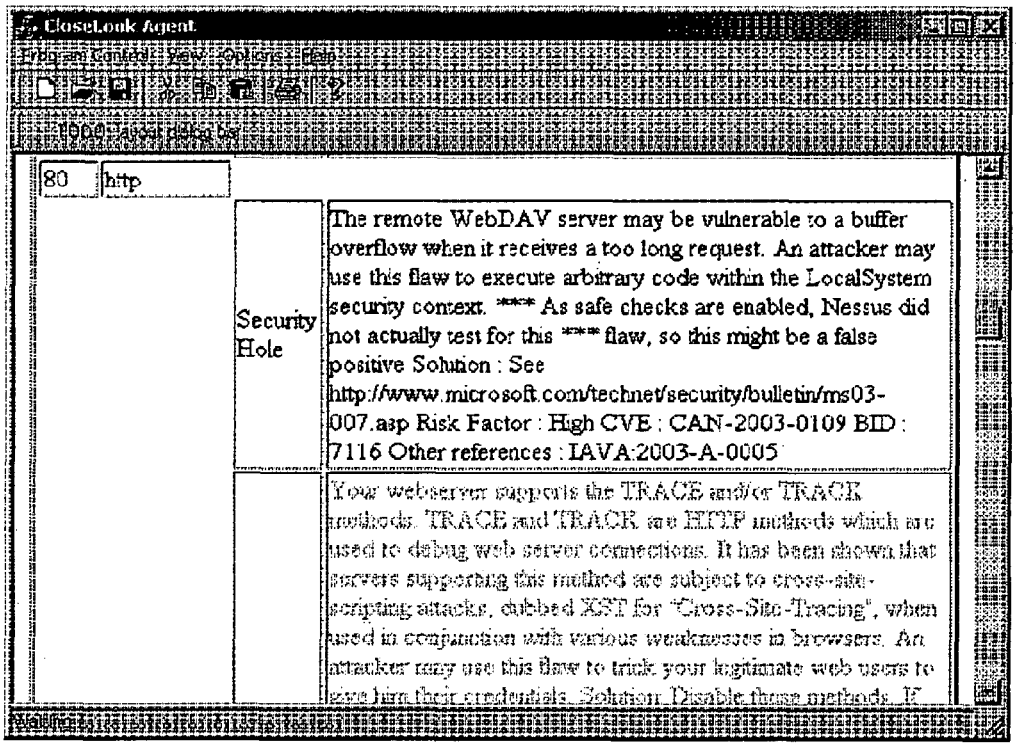
Figure 17:
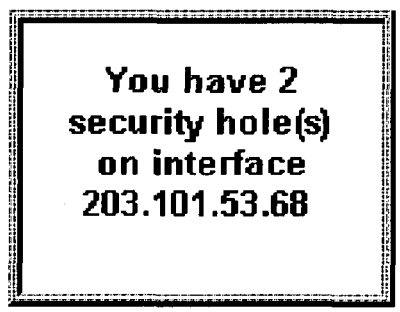

82 Host/device
83 Alert Agent
84 Vulnerability assessment server
85 Vulnerability assessment server does Vulnerability assessment FIG. 13 depicts the use case that depicts a current state of the art system as per one embodiment of the invention

LEGEND

87 Host/device
8 Server hosting a vulnerability assessment tool
89 Event: starting/booting of the host/device
90 Event: Server does Vulnerability assessment (time: beginning of week 0)
91 Event: A service is started
92 Time period in which the service is vulnerable to hacker attacks
93 Event: Server does vulnerability assessment (time: beginning of week 1)

FIGS. 14-17 show the report obtained that is passed to the agent.

The subject matter of the invention is further explained in the form of following examples. However, this should not be construed as limiting the scope of the invention.

DETAILED DESCRIPTION

The subject matter of the present invention is further explained in the form of following embodiments.

In one embodiment of the invention, a system is described that ensures real-time network-based vulnerability assessment of a host/device (FIG. 1). The system has two components—an agent application (5, 6, 7 and 8) which runs on the host/device (5, 6, 7), and a server application also called the destination server or a vulnerability assessment server (1, 9), which generally runs elsewhere on the network on a machine which is referred to as destination server. (In a special case, both the agent and server can run on the same host/device, but generally the server would be run on one machine, and agents would be run on each of the machines on which one wants to do real-time vulnerability assessment.) The host/device is any machine that runs a standard operating system such as one from the Windows family or from the Unix/Linux family, or any networking device such as a switch or a router that runs a real-time operating system or it could be an embedded system. The only requirement for the host/device is that it be able to run network services to communicate with the outside world. Though this invention as described relates to the TCP/IP protocol suite, it need not be so. This invention would apply if any standard communication protocol for communicating with the outside world is used by the host/device. The agent (5, 6, 7) and the server (1) communicate between themselves by passing information as described below. The agent is used to track in real-time the ports on which network services are listening on the various interfaces of the host. This tracking is done by tracking the start and stop of various network services on various interfaces and passing the port as well as the interface information to the server. The server application is used to run vulnerability assessment (VA) tests with the listening services on the network interfaces on the host/device as the target of vulnerability assessment. To begin with, the server application is started; it does some initial book-keeping, and waits to receive communication from the agent. Then, the agent application is started on one or more of the target machines. (In the description here, the term target machine or the client machine is used interchangeably with the terms host or device. All the four refer to the machine or the device on which the agent application runs, and whose vulnerabilities this invention detects in real-time.)

A clarification about the term real-time is in order here. Strictly technically speaking, the word "real-time" is used when the time can be measured in clock cycles on a real-time operating system. In the present invention the operating systems that envisage the host/device to run are not necessarily real-time operating systems, and tracking of open ports and subsequent vulnerability assessment, though may be possible to pin down to a time interval would be difficult to pin down in clock cycles. Thus, the expression real-time denotes an event starting the moment another event happens. In this case, the agent tracks the start and stop of services the moment they start and stop, and subsequently vulnerability assessment is started the moment it is possible to start it, within the constraints of the time taken by the operating systems involved both on the host/device and the destination server, and the time delay in communication.

One can have a configuration where one server can handle a number of agents, one agent each on a host/device. The present invention asynchronously starts a number of agents (5, 6, 7) which communicate data to and from the server (1). In fact, it is possible to have a system where tens of thousands of agents are served by hundreds of servers. However, for purposes of simplicity, in the following description a scenario consisting of one agent and one server is considered.

The agent is implemented via one or more executable agent modules which accomplish its functionality. The agent (8) keeps track of the ports on which network services are listening on the various network interfaces of the host/device/target machine and stores them in a (first) data structure (18). In one embodiment, this data structure is a simply a two-dimensional array of size 65535 with one dimension being the status of TCP ports and another status of UDP ports (22). The value of each element of the array is a boolean that indicates whether the particular port is open or not. There is a separate array for each active interface (21) of the host/device. It then reports those ports as well as the IP address of the relevant network interface to the server component (9). While reporting, it reports incremental changes in the status of ports that are listening (10, 11). In other words, it implicitly reports the start and stop of services on open ports. (In the present invention only TCP and UDP services are considered in the implementation, but this invention applies to ICMP and other non-port based services also. In those cases, instead of transmitting the port number on which the service starts/stops, some different attribute will have to be passed to the server.) This tracking of open ports may be also done in hardware in real-time. The server receives this information (12) and keeps a record of it in a (second) data structure (20). The structure of the second data structure is similar to that of the first data structure. The server is also implemented in the form of one or more executable server modules. If the server finds that there is a change in the status of the ports on which services are listening on any of reported interfaces of the target machine (13) (note that when the server starts, the status that it has is that no services are listening on any of the ports of any of the interfaces of any of the agent that may connect to it), it runs tests to find out which services are running (14), then runs the relevant vulnerability tests on the particular services on the particular interfaces of the target machine (15) and reports the results to the target machine (16). (To be precise, for the server to run tests, the change in status should be such that one or more new service are started on one or more of the ports. If the status change is such that some services are stopped, there is no need for the server to run fresh tests. It can in fact send the appropriate report of past tests done (17) to the agent as since no new services have been started, there would be no new vulnerabilities found generally. The only exception here is when a new vulnerability is discovered (publicly) and announced, and the server vulnerability database is updated with the tests for the new vulnerability. In that case, the server would run those vulnerability tests to find out if any of the services that it has previously tested do in fact have the new vulnerability.) Thus, the system (comprising of the agent (8) and the server (9)) ensures that vulnerabilities are detected the moment network services having them get started on the agent; the moment here refers to the real-time aspect of the detection of vulnerabilities. There is of course a certain time involved in reporting the ports pertaining to the start, and stop of services of a particular interface of the target machine to the server, as well as a certain time involved in running the vulnerability tests and reporting the results. This is referred to as real-time; that is, even though it cannot be categorized it in clock cycles as is done to characterize a real-time application, this is done the moment it is possible. Thus the system ensures that at no time—excepting the time taken to report the services, and run the tests as described above—the host/device/target has network services listening on it which have undetected vulnerabilities in them, thus resulting in real-time vulnerability detection for services. The system detects vulnerabilities which are present in the software executables, as well as vulnerabilities due to erroneous or non-secure configuration of network services. (The system as is designed can use various third-party VA tools to detect vulnerabilities provided they can be used to do vulnerability testing the way it is stated above; that is, they can be used to do vulnerability tests only on particular services that are listening on various ports. An example is given using the open-source tool nessus, http://www.nessus.org as a vulnerability scanner. The system can also detect backdoors installed; a backdoor is a non-standard service, one which a hacker uses plants on the users machine. All that is required to detect the backdoors in real-time is for the vulnerability assessment server to conclude that services which it can not recognize remotely could be potential security holes; backdoors would come under the above category.

Some variations on the theme of running vulnerability tests are possible. In the simplest of variations, the server can run the whole of the vulnerability assessment tests every time it notes a change in the status of ports and/or the status of interfaces on the host/device. In a second variation, it can find out which new port is opened or if any new interface has become active, and do tests to detect the services that have started on those ports, and then conduct vulnerability tests on those services. It can then produce a whole vulnerability status report by concatenating appropriately the previous report that it had, and noting the changes in the status of ports that it has now encountered. For the above purpose, it stores the results of the vulnerability tests port wise and interface wise. Thus, it can concatenate the results for the ports which were open previously, with the results for the ports which are open now, and produce an overall result. It can also produce an incremental vulnerability report for the new services that have now started.

A number of variations on the tracking theme are also possible. In one variation, the agent can send a message (just a notification) indicating that an event has occurred on the host/device that may have changed the vulnerability status of the network. This could be a start or stop of a service on an interface. The server could then run all the VA tests or do its own investigation to figure out which new ports have opened or which ports have closed, and then run the appropriate VA tests. In another variation, the agent could in fact pass more explicit information—namely the names of services—to the server. The point is the agent passes information that indicates that the vulnerability status of the host/device could have changed and vulnerability tests may have to be conducted by the server to produce the latest vulnerability status of the host/device.

Phases of the Invention (Agent Side and Server Side):

The invention consists of a system comprising of a server and an agent both of which operate concurrently and which communicate with one another by passing information to each other.

The invention consists of the following phases on the agent and the server side respectively. Please also note that variations on the invention are possible, and possible variations are mentioned in other sections of this document.

Agent Side (8):

1. Tracking the starting and stopping of each of the listening network services on each of the open ports of each of the active interfaces on the target machine (10), and intimating the open port numbers along with the IP address of the interface(s) (11) to the server.

2. Receive the reports from the server and display the results.

Please note that phases 1 and 2 on the agent occur concurrently, and are not sequential.

A report for previously run vulnerability tests may be received at the same time information for current status of open ports is sent to the server.

Also, phase 1 is done via a daemon service which wakes up once in say a certain small enough time interval, and does a polling and reports to the server if there is any change in the active status of any of the ports in any of the active interfaces. If there is no change, then it sleeps for that particular time interval before waking up to check for the above again. The daemon can also be implemented in hardware to track the changes in the status in real-time. Listening network services would also include possible (listening) backdoors that may have been planted by a hacker. Apart from reporting start and stop of services on active interfaces, another case also involves reporting the stop of the agent application itself. The server responds to the above case by resetting its data about all active interfaces on the agent, as well as the data about the agent itself. To the server, the agent is represented as an IP address of the interface of the agent through which the agent communicates to the server. A third type of case would amount to reporting of an previously active interface going inactive. What would be actually reported in the above case is the stopping of all services on the interface concerned.

As far as hosts/devices running the TCP stack is concerned, listening ports corresponding to both TCP and UDP services are reported (19). The IP address of the relevant active interface(s) is also reported (19). Ports on which services are reconfigured are implicitly reported, as since the start and stop of services are reported, those cases are covered where a service is stopped, reconfigured and then restarted.

To implement the above, there is need for a (first) data structure (18) for each of the active interfaces (21). This data structure stores the state of the ports—whether open or not (22)—for each of the active interfaces. As the status is tracked, this data structure is populated. Comparing the state of the ports at two different consecutive intervals on each of the interfaces would help find out which are the ports on which new services have started, and which are the ports on which services have stopped. This information along with the IP address of each of the interface (19) is communicated to the server. New interfaces coming up or old interfaces going down are accommodated in the data structure.

Server Side (9)

1. For each of the agents that communicate to the server a.) Receive data (12) about the open ports on which there are listening services on the various active interfaces of the agent, b.) compare this data with the earlier data available with the server and detect if there is a change in the open status of any port (13) (the server begins initially with the assumption that there are no services listening on any of the ports of any of the interfaces), c.) if there is a change in the open status of any port on any of the interfaces such that one or more new services are now running, then run a network-based VA tool to detect vulnerabilities in the services which are running on those ports for that interface, (14, 15)

d.) Report the results of the tests to the agent. (16)

e.) Repeat steps (a) to (d).

Please note that these steps (a) to (e) can take place concurrently to process information from each of the interfaces of each of the agents that connect to the server.

A (second) data structure (20) is needed on the server side for each agent that connects to it. This data structure stores the state of each of the open ports of each of the active interfaces of the agent as reported to it. Comparing two different entries filled in at two different time intervals helps to conclude whether any new service is started or stopped on any of the ports of any of the interfaces of the agent, and take a decision to run vulnerability tests on the agent.

As is said before, the system can handle a number of agents for each server. Potentially, the system could have tens of thousands of agents and hundreds of servers serving these agents.

The system can do incremental vulnerability assessment. This is one of the variations used. In this variation, instead of running a complete VA test on learning that the status of port/interfaces on the host/device has changed, the server runs tests to find out which are the services running on the open ports that now have listening services on them. Having found the services, the server runs tests on only those services, and comes up with an incremental VA results. A result for a vulnerability test indicates whether the host/device has that particular vulnerability or not. The server then stores that results port wise and interface wise. That is, say if port numbers 80 and 139 were found open, the results of the tests for the service found on port 80, and the service found on port 139 are separated out; that is, the results are classified interface and port wise. At any time, the server can come up with the overall vulnerability assessment report for the host/device by concatenating the vulnerability assessment results for the services running on various ports. This way of doing incremental vulnerability assessment saves tremendous bandwidth. If later, a new ports is found to be open, and some ports are reported as closed, the server runs the vulnerability tests only for the newly opened ports, and produces a complete VA report by concatenating reports for the opened ports while removing reports for the closed ports from the overall report.

Various Scenarios of Deployment of the Invention

FIG. 1 shows a typical scenario of the invention. (See the section titled Brief Description of the Accompanied diagrams for the legend of the figure.) A number of security alert agents (5, 6, 7) one each on each of the target machines or clients, do tracking of new network services as they start and stop. The server, herein called the vulnerability assessment (VA) server (1), contains a database of vulnerabilities (2) as well as a VA tool server. The following description will refer to the scenario given in the figure although other scenarios are also possible. For instance, one of the scenarios could be the case where both the agent and the server are run on the target machine itself. Other scenarios could include a server running on the Internet, or a combination of two servers—a server on the customer's enterprise system and a master server on the Internet accomplishing the job. A fourth scenario could include some other combination of agents—say, a number of peer agents, and servers comprising of the system, a scenario similar to the one given in the figure except that the peer agents communicate among themselves to exchange information.

Step 1: The server starts and waits for the agent to communicate to it

First, the VA server is started, does some book-keeping and waits for an agent (agents) to communicate to it.

Step 2: The agent starts, tracks the starting/stopping of services and communicates the open port numbers and the IP addresses of the various interfaces to the server This step involves finding out in real-time whenever a new network service is started or stopped on a host, The former—namely finding out whenever a new service is started—can be achieved either by deploying appropriate hooks to track the above in real-time or by running a service such as netstat every few seconds to detect the above.

The concept of tracking the start or stop of a service itself may not be new. Hooks have been deployed in various network services for various reasons in different applications. For instance the famous TCP wrapper program [4] [Practical Unix and Internet Security, Simson Garfinkel and Gene Spafford, 2 nd Edition, 1996, Oreilly] which protects network services by restricting access to network services based on the source IP address of the client accessing the service replaces the calls accessed by a service to access the ports by its own calls which in turn calls the service's calls after doing the appropriate kind of filtering.

Step 3: Intimation to the VA tool

The fact that a new network service is started or stopped is intimated to the VA server in this step. In both the cases, if there is a port number associated with the service, then port number on which the service is listening is intimated. This step is carried out by the agent on the target machine by communicating to the server using a utility such as sockets.

Step 4: The server checks if any new ports on which services are listening have been opened, and if so does vulnerability assessment tests on those services Knowing the fact that a new service has been started or that the configuration of a particular service has been changed, the VA tool which is present on the server runs various vulnerability assessment tests on the particular service on the target machine. On the basis of the tests, the VA tool concludes if there has been any vulnerability found in the particular service. While doing so, the VA tool only runs the minimum tests necessary so as to save bandwidth; to this end, it makes maximum use of the information that it has received in phase 3 above. For instance, it would know which ports were open before and which services were running on them, so it would not need to run VA tests on those services again. After running the tests, it sends the report to the agent.

Accomplishments of the Invention

What the invention described above accomplishes is a system wherein there do not exist undetected vulnerabilities in any of the network services that run at "any" time. Of course, this is subject to the capabilities of the vulnerabilities assessment tool used. Any is quoted because strictly speaking there is some time involved between manifestation of a vulnerability and detection of it, what is referred to as "detection in real-time". The real time tracking of the status of ports which amounts to tracking of the beginning and ending of services on all the active interfaces is the key to this aspect. The above is the major technical advantage of the invention which is not found elsewhere. Expressed in different words, this invention is a generalization of an online anti-virus package such as Norton's when applied to vulnerabilities. Just as an anti-virus package continually looks for viruses and blocks them, as well as updates new virus information from the company's web-site, the invention described does so for vulnerabilities, except that it does not fix security holes, it only detects the vulnerabilities. It "continually" looks for vulnerabilities in services and reports them. It also detects backdoors in real-time. Also, it can be augmented to have the ability to update itself with new vulnerability information so as to keep itself current. The augmentation that does the above has been included in the description in the claims and UML modeling sections that follow.

The above invention also gives rise to deploy and forget model for a real-time vulnerability assessment tool. All current tools do vulnerability assessment off-line that is once in a while. They have to be specifically instructed as to when to run VA tests. A product based on this invention makes it possible for companies to just install this product once, and get vulnerability alerts the moment the vulnerabilities occur whenever they want. They need not explicitly run a VA tool; a VA tool implicitly gets run whenever is needed and to the extent needed. They also need not miss any vulnerability. Thus, this invention gives rise to intelligent vulnerability assessment.

A third major accomplishment of this invention is the incremental nature of running the VA tool. In order to find the vulnerabilities, the server notes the difference between which new ports, and hence which new services are now open in comparison with the last run of the VA tests, and only runs those vulnerability tests that are needed. Thus, this invention accomplishes vulnerability assessment without the bandwidth hog that would be needed if one were to run a complete vulnerability scan on the target.

The above three accomplishments make a product based on this invention ideally suited for sitting continuously on enterprise/consumer systems. By consuming little bandwidth and at the same time continuously keeping a vigil on the start and stop of services, one can just install this agent and server and rest assured that one will get an alert whenever a new vulnerability occurs on one's system. One is not even required to schedule any vulnerability tests as happens with current tools.

All the above accomplishments of course come at a price. The requirement to install an agent is the price that is paid.

UML Modeling

The system that is envisaged is described here, using UML notation.[15] [Visual Modeling with Rational Rose and UML, Terry Quatrani, Addison Wesley, 1998]. Note that the description given is a sample description and variations on the theme are possible.

Actors

In UML terminology, actors are those entities that interact with the system. They are not part of the system, but they are those entities who use the system and for whom in a sense the system is built.

The actors in the present system are given below.

1. Sys Admin/Security Manager

The sys. Admin/Security Manager is responsible for installing the tool (both the agent and the server) as well as starts the agent and server applications of the tool.

2. Vulnerability Assessment Server Vendor

The vulnerability assessment server vendor is responsible for carrying periodic updates to the server by adding new vulnerabilities to the vulnerability database as they get discovered, as well as by adding scripts to test for the new vulnerabilities discovered.

3. User

The user uses the host/device and during the course of the use of the system starts and stops various network services on various ports.

Note: Network services get started and stopped by other programs also. For instance, a program can start a mail service and use it. A hacker might plant a backdoor which could be a listening service.

Use Cases

Use cases signify important functionality of the system. Each use case signifies a particular major functionality that the system delivers to the actors. There are eight use cases in the present system. They are the following:

1) Start of the server and the agent
2) System response to starting of a new listening service (that is, opening of a port on which a service listens)
3) System response to stopping of a listening service (that is closing of a port on which a service listens)
4) System response to a new network interface becoming active
5) System response to a network interface becoming inactive
6) Stop of the agent
7) System response to update of vulnerability and script database
8) Vulnerability Assessment Actors and Use Cases The interaction of the actors with the use cases is given in FIG. 4. (See the section titled Brief Description of the Accompanied diagrams for the legend of the figure.)

1) Sys. Admin communicates (23) with use case 1 (26)
2) User (24) communicates with use case 2 (27) (Use case 2 can also happen on spontaneous start of a listening service, that is without the interaction with the user.)
3) User communicates with use case 3 (28) (can also happen on stop of a listening service initiated by other means)
4) User communicates with use case 4 (29) (can also happen on coming up of an interface initiated by other means)
5) User communicates with use case 5 (30) (can also happen on going down of an interface initiated by other means)
6) Sys admin communicates with use case 6 (31)
7) Security vendor communicates (32) with use case 7
8) Use case 8 (33) is used by use cases 1 to 7

Objects and Classes

A first cut design of the system involves three major classes. The host/device (this basically involves the hardware and the operating system) is modeled as one class, the agent application that is deployed on the host/device, one that tracks the start and stop of the services on the host/device is modeled as a class and the server which runs the VA tool is modeled as a class.

Details of the Use Cases and Sequence Diagrams

1. Start of the server and the agent

Brief Description: This use case is started by the sys. Admin; it ensures that the server and the agent is started; the agent on being started reports the ports on which listening services are started to the server, which runs a VA tool to detect vulnerabilities in the above services.

Event Flow

Preconditions: None

Main Flow:

This use case is started by the sys-admin. Basically, he starts the server on the server machine and the agent on the target host/device respectively; the agent application deployed on the target host/device communicates to the server running the VA tool the port numbers on which listening services have been started. The server runs the VA tool, which detects vulnerabilities in the target. At the end of the use case, the system does not have any undetected vulnerabilities. Of course, this is subject to the fact that the vulnerability assessment tool is up-to-date with scripts for all the vulnerabilities. The steps beginning from the agent intimating to the server about the starting of the host/device to detection of vulnerabilities is carried out by Use case 8.

Sub flows: None

Alternate flows: None.

The sequence diagram for this use case is shown in FIG. 5. (See the section titled Brief Description of the Accompanied diagrams for the legend of the figure.)

2. System Response on the start of a listening service

Brief Description: This use case is started by the user or any program which starts a network service; it ensures that the network service that is started is tracked in real-time, and checked for vulnerabilities, so that the system does not have any undetected vulnerabilities.

Preconditions: Use case 1 should have occurred.

Main Flow:

This use case is either started by the user of the system or by some other program which starts a network service. Basically, this use case leads to starting of a network service on the host/device and subsequent checking of vulnerabilities in the particular service. The agent tracks the starting of the service and communicates the number of the open port to the server, which using Use Case 8 detects the vulnerabilities in the system. Thus, at the end of this use case, the system does not have any undetected vulnerabilities. The second condition occurs because the system already has no undetected vulnerabilities via use case 1, which is a precondition for this use case, before the network service is started.

Sub flows: None

Alternate Flows: None.

The sequence diagram for this use case is given in FIG. 6. (See the section titled Brief Description of the Accompanied diagrams for the legend of the figure.)

3. System response on the stop of a service

Brief Description: This case is the same as Use case 2 except for the fact that the service is stopped.

Preconditions: Use Case 1 has occurred before, and a service is running.

Main Flow:

This use case is either started by the user of the system or by some other program which stops a network service which was started. Basically, this use case leads to stopping of a network service on the host/device and subsequent tracking of the stop and communicating it to the server, and the server passes an updated report of vulnerabilities back to the agent.

The agent tracks the stopping of the service and communicates the port number on which the service was previously listening to the server. The server would note that this service was once running and is now stopped, so there are no new vulnerabilities to be detected, and it would update the report and pass it to the agent. Thus, at the end of this use case, the user gets a system does not have any undetected vulnerabilities as before.

Sub flows: None

Alternate flows: None.

The sequence diagram for this use case is given in FIG. 7. (See the section titled Brief Description of the Accompanied diagrams for the legend of the figure.)

4. System response to a new network interface becoming active

Brief Description: This use case is started by the User or via other means; it starts when a new interface comes up; the agent notes which are the open ports on which there are listening services on the new interface, and reports those ports to the server. The server runs a VA tool to detect vulnerabilities in the above services.

Event Flow

Preconditions: None

Main Flow: This use case is started by the User or via other means; it starts when a new interface comes up; the agent notes which are the open ports on which there are listening services on the new interface, and reports those ports to the server. The server runs a VA tool to detect vulnerabilities in the above services.

Sub flows: None

Alternate flows: None.

The sequence diagram for this use case is given in FIG. 8. (See the section titled Brief Description of the Accompanied diagrams for the legend of the figure.)

5. System response to a network interface becoming inactive

Brief Description: This use case is started by the User or via other means; it starts when an interface which was once up goes down; the agent notes which were the open ports on which there were listening services on the interface, and reports those ports to the server along with the fact that those ports are now closed. The server updates the data that it has regarding the above interface.

Event Flow

Preconditions: None

Main Flow: This use case is started by the User or via other means; it starts when an interface which was once up goes down; the agent notes which were the open ports on which there were listening services on the interface, and reports those ports to the server along with the fact that those ports are now closed. The server updates the data that it has regarding the above interface.

Sub flows: None

Alternate flows: None.

The sequence diagram for this use case is given in FIG. 9. (See the section titled Brief Description of the Accompanied diagrams for the legend of the figure.)

6. Stop of the agent

Brief Description: This use case ensures that the server updates it data after a graceful close by the agent.

Preconditions: Use case 1 has occurred.

Main Flow:

This use case is started by the sys. Admin. When he stops the agent application, the agent communicates to the server that the agent application has stopped. Thus, the server updates its data to note it. This use case is especially applicable for agents having DHCP addresses as there is then no mix-up on the server side if a machine on a different agent later connects to the server with the same IP address as of the earlier agent which had connected earlier.

Sub flows: None

Alternate flows: None

The sequence diagram for this use case is given in FIG. 10. (See the section titled Brief Description of the Accompanied diagrams for the legend of the figure.)

7. System response to update of vulnerability and script database

Brief Description: This use case ensures that the system does not have any undetected vulnerabilities that are newly discovered and announced through a forum such as CVE. As new vulnerabilities get discovered, they are added in the vulnerability database and the system tested for presence of these vulnerabilities.

Preconditions: Use case 1 has occurred.

Main Flow:

This use case is started by the vulnerability server vendor. As new vulnerabilities get discovered, the vendor updates his vulnerability and script database. On a signal that the vulnerability database is updated, the VA server scans the target system for presence of these new vulnerabilities, and if found sends a report to the agent. This is carried out using Use Case 8.

Sub flows: None

Alternate flows: None

The sequence diagram for this use case is shown in FIG. 11. (See the section titled Brief Description of the Accompanied diagrams for the legend of the figure.)

8. Vulnerability assessment

Brief Description: This use case is used by other use cases to detect vulnerabilities (See description of other use cases above.) This use case ensures that the target system is checked for vulnerabilities, so that the system does not have undetected vulnerabilities.

Precondition: One of the following must occur.

a. The agent is started and the list of open ports on which services are listening are communicated to the server.

b. A network service is started and the agent communicates the port number on which the service is started to the server.

c. The vulnerability and script database is updated with one or more new vulnerabilities and scripts.

Main Flow a. This use Case initiated by Use Cases 1 to 6. Subflow S1 is taken.

b. This use Case is intiated by Use Case 7. Subflow S2 is taken.

Subflow S1:

The VA tool on the server checks if there is any change in status of open ports on the target system; if there are any "new" open ports, then it finds remotely what services are running on those ports, tests those services for vulnerabilities, and sends the report to the agent.

Subflow S2:

When this use case is initiated by Use Case 7, this flow is taken. When new VA tests tare added to the vulnerability database, this flow checks if there are any services running which pertain to these new tests, and if so these tests are run, and the results reported to the agent.

Alternate Flows: None.

A high-level sequence diagram for this use case is shown in FIG. 12. (See the section titled Brief Description of the Accompanied diagrams for the legend of the figure.)

Sequence Diagram for a current state-of-the-art system

FIG. 13 gives the sequence diagram of a system which is of the current state of the art. (See the section titled Brief Description of the Accompanied diagrams for the legend of the figure.) It is to be noted that since vulnerability assessments are done once in a week or some such regular interval as per the security policy of the enterprise, services that are started in the middle of this period remain vulnerable at least up to the time the next vulnerability assessment is conducted, and this time could be substantial thus making the system prone to exploitation by hackers. Of course, if these services are stopped during the time the VA tool is run, and restarted again after the VA tool has finished running, vulnerabilities in them may never get detected.

EXAMPLES

There are tens of examples that can be given for illustrating the scenarios that are covered by the present invention. Here, the present invention is illustrated with two simple examples.

Denial of service attack on an X server

Consider a Red Hat 7.0 Linux system as the host/device which starts in run level 3, with the X server not being started. As the system starts, an agent perched on the system intimates to the VA server the start of various services, and the VA server checks it for vulnerabilities; then the system does not have any undetected vulnerabilities. Now the user starts the X server possibly by taking the system to run level 5, a level in which Red Hat automatically starts the X server. The alert agent tracks the above in real-time and intimates to the server running the VA tool that a new service has been started on the particular port 6000; the server does the relevant VA tests and comes up with the following VA assessment.

X server is running on port 6000. Although the X server does not allow any client to connect to it, an attacker may send garbage data and slow down the X session or even kill the server [14] [www.nessus.org, Nessus, the open-source VA tool]. The CVE [3] [http://cve.mitre.org] number is CVE-1999-0526. The recommendation is to filter the incoming connections to port 6000-6009.

The alert agent is intimated of the results of VA.

Response to start of a service on port 80

The present invention has an agent running on a Windows 2000 system. The agent application starts and the VA server is intimated of the open ports where various services have been started, which runs a VA tool (in this case nessus) and the report is shown below. An IIS web server is started on the Windows 2000 system. The agent reports the fact that new ports have been opened (namely ports 80 and 443) and the server runs tests first to find out which services are running on those ports, and then runs various vulnerability tests on the services. The report obtained is passed to the agent as shown in FIGS. 14-17.

Implementation Issues:

A very brief implementation overview of implementing this invention with Nessus, the open source VA scanner is given below. However, this invention by itself is not constrained by the use of Nessus. Any Vulnerability assessment tool which is designed in a modular fashion should be usable. However, it is not necessary that the implementation has to be implemented with a current VA tool. A new VA tool suited for the purposes of the implementation can also be written.

Overview of Nessus:

An overview of Nessus is provided to understand the present system implementation. Nessus is an open-source VA scanner available at http://www.nessus.org. Nessus consists of two parts: a nessusd server which runs as a daemon (on a Unix machine), and a nessus client. The nessusd server is the VA engine, while nessus client helps a user to appropriately configure nessusd for one's use. Nessus can be used via a GUI or via a command line option. There is a concept of plugins in the way nessus and nessusd are designed. A plugin consists of a vulnerability test. The way nessus is designed one can write plugins separately and add to nessus and nessusd on the fly in the sense plugins don't have to be compiled with nessus or nessusd at compile time. A lot of the plugins (the .nasl plugins specifically) are interpreted. There is a plugin directory in which plugin files are placed, and nessusd reads the plugins from this directory every time it is started.

Thus, one can populate the plugin directory with the plugins one wants, and start nessusd.

There are also configuration files that both nessusd and nessus use. The nessusd configuration file is called nessusd.conf while the nessus configuration file is called .nessusrc. These files can be configured to one's liking to tune how nessusd and nessus are run.

There is also a knowledge base (KB) that the plugins of nessus populate and use. A more detailed explanation including the source code of nessus is available at http://www.nessus.org.

There are a number of issues to be resolved when deciding how to invoke nessus for the purposes of real-time VA. The issues involved and the solutions are discussed here.

Using Nessus for Real-Time Vulnerability Assessment

The requirements for using nessus for real-time VA are the following. Initially, VA test is performed on the services running on specific ports on the host/device. These port numbers will be intimated to us. In other words, if a specific port say port number 25 is open on the host/device, it is necessary to identify the service running on it, and then run vulnerability assessment tests for that service. Specifically, the present invention should be able to do this on say the only port which is given to us. Other ports may be open on the host/device at that time.

Issues Concerning Nessus

The way nessus and nessusd run bring specific problems when the above requirements are considered.

Running Nessus as a Whole

Nessus consists of nessusd, the server which runs as a daemon and nessus the client.

When nessusd and nessus are run as a whole, the following takes place. All the plugins are loaded from a directory meant for plugins (this directory is specified in the nessusd.conf file) while starting nessusd, and then nessus is used to run the tests on a particular IP address as target. The plugins that are loaded usually consist of a port scanner such as nmap, plugins such as find_services which identify the services running on specific ports, and plugins meant for specific services and for standard ports (this is explained in detail below).

The way nessusd and nessus work is that plugins populate a KB (knowledge base) for the above purposes. Some plugins populate the various attributes of the KB. Other plugins read these attributes and use the values placed in them to make various decisions. The key here is that a plugin that uses the values placed in the various attributes of the KB assumes that the plugin which populates the attributes has run before it and done its job. If the previous plugin hasn't run, the concerned plugin will quietly not to do anything.

In other words, the plugins on which the concerned plugin is dependent have to be run to get sensible results.

Plugin issues: script_require_ports

A plugin can be of various types: namely a .nes, a .inc or a .nasl plugin.

A .nasl plugin may have a line in its code that has the attribute script_require_ports in it.

For instance, a plugin can have the following line

Script_require_ports ("www/services", 80)

What the above means is that the plugin will be launched if the attribute www/services is filled up in the KB. In the absence of that attribute filled up, it will run on port 80 if the port 80 is open.

In effect, what the above means is that the plugin is meant to be run for the WWW service. If there is no such service running and if port 80 is open, it assumes that the WWW service exists on port 80 and runs itself.

The www/services part of the attribute will be filled by the find_services plugin which should be run before this plugin.

The find_services plugin will also be stated in the dependency list of the above plugin which is described below.

Dependency List of Plugins

A .nasl plugin has a dependency list. The dependency list gives the list of plugins which the plugin depends on, and which should be run before the plugin is run.

The auto_run_dependencies, if set in the nessusd.conf file will automatically run the dependencies of the plugin.

Find_Services Plugin Related Issue

Find_services.nes plugin finds the service which run on a specific port. It picks up the port numbers from the KB (a port scanner or some other plugin must populate the KB before the find_services plugin is run) and then it populates attributes of the KB pertaining to services which it has found on the ports. For instance if it finds the WWW service on port 62, it would populate WWW/services to be 62.

The problem with find_services is that it does the above only for TCP services, and not for UDP services.

In the absence of find_services.for UDP, UDP plugins will be run on all ports.

Thus, to implement this invention using nessus a find_services plugin for UDP has to be written.

Port Scanner Related Issue

The requirement is such that, since a list of ports is given, there is no need to run the port scanner. However, run of a port scanner or equivalent is needed in nessus since the attributes corresponding to open ports have to be populated in the KB. Thus, an equivalent plugin has to written to replace the port scanner. This new plugin would take a list of one or more ports and populate the KB attributes appropriately.

Other Issues: Restarting Nessusd as Against Operating Through .nessusrc Changes

Nessus author recommends that nessusd to be started and load all the plugins. Then, nessus is run and by giving an appropriate .nessusrc while running nessus, it can be decided which plugins are required to be run for a particular run.

It has been found that this process is 4 to 5 times slower than if only those plugins are loaded that are needed while starting nessusd in the first place, and giving an empty .nessusrc while running nessus.

Thus, there are two ways of running nessusd and nessus now. By loading the plugins appropriately and restarting nessusd or by overriding the plugin list via .nessusrc. the solutions involving both are examined below.

Other Issues: Services Running on Non-Standard Ports

In general, it is possible, though rare, that a service runs on non-standard ports: That is, one can have an smtp server running on port 80 for instance. In the following discussion two cases are considered: case a) services running on their own standard ports b) a service could be running on any port, not necessarily its own standard port.

Running Nessus for Real-Time VA

Considering the above preamble, the present system is ready to run nessus for real-time VA.

The nmap is substituted, the port scanner used by nessus with the present invention port scanner equivalent plugin, one that takes a list of ports and populates the KB just the way nmap would have, had it found the same ports open.

A Find_Services Plugin for UDP is Added.

considering the case when the only port given to us is say port 25.

Case 1) Services Run only on their own standard ports a) The standard way, that is by loading all plugins first and then overriding plugins via .nessusrc Running nessus the standard way. That is, start nessusd by loading all the plugins, run the port scanner equivalent plugin, run find services plugins—Tcp or Udp depending on what is running on port 25, and from the service found run the appropriate plugin(s) for the service found.

This should work fine except for the fact that this way could be slow.

b) the Faster way, only load the plugins that are needed

Here only the plugins that are needed are loaded; that is, the port scanner equivalent, the find_services plugin and the plugins which have 25 in the script_require_ports. An empty .nessusrc is given, restart nessusd and run. That would be fast.

Case 2) General Case: Services can run on any port not necessarily standard ports The standard way, by loading all plugins and overriding via .nessusrc This should be the same as Case 1) standard way. A bit slower but no complex implementation issues.

The Faster way, by only loading the needed plugins

The big implementation issue here is the following: plugins cannot be changed dynamically in nessusd except through a restart. And which service is running can be known only after running find_services, hence it has to be done in two steps, and store and recover the KB in between the two runs.

Run 1)

Load port_scanner equivalent and find_services, UPD or TCP as is the case. Launch the plugins and populate the KB with the appropriate attribute depending on the service found.

Save the KB.

Run 2)

Read the KB, and depending on the service, find out which plugins have to be loaded. For instance if the attribute filled up is WWW/.services then all .nasl plugins which have WWW/services in the script_require_ports will have to be loaded.

Then, have all the plugins in the plugin directory and restart nessusd with the appropriate plugin directory at the same time recovering the KB.

Then run those plugins.

I claim:

1. A system for real-time vulnerability assessment of a host computer or device, said system comprising:

an agent residing and running on the host computer or device, said agent comprising:

an executable agent module configured to track in real-time the status of interfaces and ports on interfaces of host computer or device by monitoring and storing the status information as information entries in a first data structure, wherein the agent tracks the status of interfaces and ports by listening to the start and stop of network services on the host computer or device in real-time;

said executable agent module configured to compare the entries to determine any change in the status of at least one of interfaces and ports on the interfaces of the host computer or device, said executable agent communicating the information entries to a remote destination server on the network;

the remote destination server comprising:

an executable server module configured to receive the information entries communicated by the executable agent module, said executable server module configured to store the received information entries in a second data structure, wherein the information entries indicate the state of each of the ports on each of the active interfaces of the host computer or device, said executable server module configured to compare the received information entries with stored information on the server to determine the change in the status of at least one of interfaces and ports on the interfaces of the host computer or device, and said executable server module configured to run a network based vulnerability assessment tests on the host computer or device in the event of a change in the status of at least one of interface and ports.

2. The system of claim 1 wherein said executable server module is configured to receive and update the vulnerability data in a vulnerability database whenever new vulnerabilities are discovered, and wherein said executable server module is configured to test the host/device for the new vulnerabilities whenever the vulnerability database is updated with new vulnerabilities, and to determine the new vulnerabilities.

3. The system of claim 1, wherein status of an interface is either active or inactive.

4. The system of claim 1, wherein status of a port is a service listening on the port or not.

5. The system of claim 1, wherein the agent tracks the change in status of at least one of ports and interface by at least one of monitoring in real-time and polling at periodic intervals for the status of one of ports and interfaces and storing the entries.

6. The system of claim 1, wherein the communication protocol between the host computer or device and the destination server is a standard transport level utility selected from sockets or any other standard communication protocol.

7. The system of claim 1, wherein the server executable module compares the entries corresponding two consecutive time intervals.

8. The system of claim 1, wherein the host computer or device is selected from a switch, a router, a device running a standard real-time operating system, a mobile device or a PDA.

9. The system of claim 1, wherein the host computer or device is an enterprise or consumer machine running with Windows, Unix, Linux, VxWorks, Symbian or PalmOS.

10. The system of claim 1, wherein the changes that are communicated to the destination server consisting of the IP address of the interface(s) and the port numbers on which listening services have started or stopped on the particular interface(s).

11. The system of claim 1, wherein the status of the port consists of separate statuses for TC and UD protocols.

12. The system of claim 1, wherein plurality of host computer or devices is tracked in conjunction with one or more destination servers handling the host computer or devices.

13. Logic encoded in a program stored in a computer readable storage device for real-time vulnerability assessment of a host computer or device, and said program when executed by a computer causes the computer to perform the following steps:

an agent residing and running on the host computer or device, said agent, tracking in real-time the status of at least one of interfaces and ports on a host computer or device by monitoring and storing the status information as information entries in a first data structure, wherein the agent tracks the status of interfaces and ports by listening to the start and stop of network services on the host computer or device in real-time;

comparing the entries to determine any change in the status of at least one of interfaces and ports on the interfaces of the host computer or device, communicating the change in the status of at least one of the interfaces and ports of the host computer or device to a remotely located destination server on the network, tracking, by the remote destination server, in real-time the status of ports and interfaces of the host computer or device communicated by the agent, and conducting, by the remote destination server, a network based vulnerability assessment tests on the host computer or device in the event of a change in the status of at least one of interfaces and ports of the host computer or device.

14. The logic of claim 13, wherein the status of an interface is either active or inactive.

15. The logic of claim 13, wherein status of a port is a service listening on the port or not.

16. The logic of claim 13, wherein the status of the port consists of separate statuses for TC and UD protocols.

17. The logic of claim 13, wherein tracking consists of the agent tracking the change in status of at least one of ports and interface by at least one of monitoring in real-time and polling at periodic intervals for the status of at least one of ports and interfaces on the host computer or device.

18. The logic of claim 15, wherein the communication protocol between the host computer or device and the destination server is a standard transport level utility selected from sockets or any other standard communication protocol.

19. The logic of claim 13, wherein the host computer or device is selected from a switch, a router, a device running a standard real-time operating system, a mobile device or a PDA.

20. The logic of claim 13, wherein the host computer or device is an enterprise or consumer machine running with Windows, Unix, Linux. VxWorks Symbian or PalmOS.

21. The logic of claim 13, wherein the changes that are communicated to the destination server consisting of the IP address of the interface(s) and the port numbers on which listening services have started or stopped on the particular interface(s).

22. The logic of claim 13, wherein the information that is communicated from the host computer or device to the destination server is the names of the services.

23. The logic of claim 13, wherein the information that is communicated from the host computer or device to the destination server is a message signaling a change in the status at least one of interfaces and ports on the host computer or device.

24. The logic of claim 13, wherein the vulnerability assessment server used by the destination server is updated with the new vulnerabilities to test the presence of vulnerabilities.

25. The logic of claim 13, wherein a plurality of host computer or devices are tracked in conjunction with plurality of destination servers handling the host computer or devices.

26. A computer-implemented method for real-time vulnerability assessment of a host computer or device, said method comprising:
- tracking, by the agent residing and running on the host computer or device, in real-time the status of interfaces and ports on the host computer or device,
- wherein the agent tracks the status of interfaces and ports by listening to the start and stop of network services the host computer or device in real-time;
- collecting and storing the status as information entries in a first data structure on the host computer or device;
- comparing the entries to determine any change in the status of at least one of interfaces and the status of ports on the interfaces of the host computer or device;
- communicating the changes in the status of interfaces and the status of ports to a remotely located remote destination server on the network;
- storing said changes as entries in a second data structure in the remote destination server wherein the entries indicate the state of each of the ports on each of the active interfaces of the host computer or device communicated by the agent;
- comparing, by the remote destination server, the entries stored at the remote destination server to determine it there is any change in the status of interfaces and ports on the interfaces of the host computer or device; and
- running, by the remote destination server, a network based vulnerability assessment tests on the host computer or device and reporting the results.

27. The method of claim 26, wherein the status of an interface is either active or inactive.

28. The method of claim 26, wherein the status of a port is a service listening on the port or not.

29. The method of claim 26, wherein the agent tracks the change in status of at least one of ports and interface by at least one of monitoring in real-time and polling at periodic intervals for the status of at least one of ports and interfaces and storing the entries.

30. The method of claim 26, wherein the communication protocol between the host computer or device and the destination server is a standard transport level utility selected from sockets or any other standard communication protocol.

31. The method of claim 26, wherein the server executable module compares the entries corresponding two consecutive time intervals.

32. The method of claim 26, wherein the changes that are communicated to the destination server consisting of the IP address of the interface(s) and the port numbers on which listening services have started or stopped on the particular interface(s).

33. The method of claim 26, wherein the status of the port consists of separate statuses for TC and UD protocols.

34. The method of claim 26, wherein the plurality of host computer or devices is tracked in conjunction with one or more destination servers handling the host computer or devices.

* * * * *